United States Patent
Dudda et al.

(10) Patent No.: US 10,673,729 B2
(45) Date of Patent: Jun. 2, 2020

(54) CONTROL OF CELLULAR NETWORK OPERATION USING INTERFERENCE-BASED METRIC

(71) Applicant: Telefonaktiebolaget LM Ericsson (publ), Stockholm (SE)

(72) Inventors: Torsten Dudda, Aachen (DE); Tim Irnich, Neuss (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 229 days.

(21) Appl. No.: 15/039,754

(22) PCT Filed: Nov. 29, 2013

(86) PCT No.: PCT/EP2013/075066
§ 371 (c)(1),
(2) Date: May 26, 2016

(87) PCT Pub. No.: WO2015/078509
PCT Pub. Date: Jun. 4, 2015

(65) Prior Publication Data
US 2016/0380870 A1  Dec. 29, 2016

(51) Int. Cl.
*H04L 12/26* (2006.01)
*H04W 24/02* (2009.01)
*H04L 1/20* (2006.01)
*H04J 11/00* (2006.01)
*H04W 36/24* (2009.01)
(Continued)

(52) U.S. Cl.
CPC ............ *H04L 43/16* (2013.01); *H04J 11/005* (2013.01); *H04L 1/20* (2013.01); *H04W 24/02* (2013.01); *H04W 36/24* (2013.01); *H04W 16/10* (2013.01); *H04W 24/10* (2013.01); *H04W 48/02* (2013.01); *H04W 48/16* (2013.01)

(58) Field of Classification Search
CPC ...... H04W 24/02; H04W 36/24; H04L 43/16; H04J 11/005; H04J 11/0053
See application file for complete search history.

(56) References Cited

U.S. PATENT DOCUMENTS

2006/0094452 A1* 5/2006 Kang ................... H04W 48/20
455/464
2008/0057973 A1 3/2008 Park
(Continued)

FOREIGN PATENT DOCUMENTS

WO WO 2013/104442 A1 7/2013
WO WO 2013/140244 A1 9/2013

OTHER PUBLICATIONS

International Search Report and Written Opinion of the International Searching Authority, Application No. PCT/EP2013/057066, dated Oct. 6, 2014.
(Continued)

Primary Examiner — Omer S Mian
(74) Attorney, Agent, or Firm — Patent Portfolio Builders, PLLC

(57) ABSTRACT

An interference-based metric is used for control purposes in a cellular network, e.g., for controlling association of a user equipment to a cell of the cellular network. The metric is defined as a ratio of a first value and a second value. The first value represents the strength of a reference signal (RS) transmitted by a base station of the cell as measured by the user equipment. The second value represents the strength of interference (IF) at the user equipment. Depending on the metric, a radio access configuration for the user equipment and the cell is controlled. This may for example involve association of the user equipment to the cell, e.g., in the course of a handover process or idle mode cell selection process.

19 Claims, 14 Drawing Sheets

(51) Int. Cl.
H04W 48/16 (2009.01)
H04W 16/10 (2009.01)
H04W 48/02 (2009.01)
H04W 24/10 (2009.01)

(56) References Cited

U.S. PATENT DOCUMENTS

| | | | |
|---|---|---|---|
| 2009/0147790 A1 | 6/2009 | Kang et al. | |
| 2010/0130133 A1 | 5/2010 | Lou et al. | |
| 2010/0311452 A1* | 12/2010 | Li | H04W 72/08 455/509 |
| 2011/0256878 A1 | 10/2011 | Zhu et al. | |
| 2012/0094703 A1* | 4/2012 | Sasayama | H04W 24/10 455/507 |
| 2013/0219055 A1* | 8/2013 | Palanki | H04B 17/24 709/224 |
| 2013/0258876 A1* | 10/2013 | Damji | H04W 52/0254 370/252 |
| 2014/0378145 A1* | 12/2014 | Legg | H04W 36/0083 455/437 |

OTHER PUBLICATIONS

3GPP, Technical Specification—"3rd Generation Partnership Project; Technical Specification Group Radio Access Network; Evolved Universal Terrestrial Radio Access (E-UTRA); Physical layer; Measurements (Release 11)", 3GPP TS 36.214 V11.1.0 (Dec. 2012), 14 pp.

3GPP, Technical Specification—"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.7.0 (Sep. 2013), 209 pp.

3GPP, Technical Specification—"3rd Generation Partnership Project; Technical Specification Group Radio Access Network; Evolved Universal Terrestrial Radio Access (E-UTRA); User Equipment (UE) procedures in idle mode (Release 11)", 3GPP TS 36.304 V11.5.0 (Sep. 2013), 34 pp.

3GPP, Technical Specification—"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.5.0 (Sep. 2013), 347 pp.

Carvalho et al., "An Enhanced Handover Oscillation Control Algorithm in LTE Self-Optimizing Networks", *IEEE 2011 14$^{th}$ International Symposium on Wireless Personal Multimedia Communications (WPMC)*, Oct. 3, 2011, 5 pp.

Jansen et al., "Handover parameter optimization in LTE self-organizing networks", *IEEE Vehicular Technology Conference Fall (VTC 2010—Fall)*, Piscataway, NJ, Sep. 6, 2010, 5 pp.

International Search Report and Written Opinion of the International Searching Authority, Application No. 13 798 656.1-1505, dated Mar. 6, 2017.

EP office action in application No. 13798656.8 dated Mar. 6, 2017.

\* cited by examiner

CONTROL OF CELLULAR NETWORK OPERATION USING INTERFERENCE-BASED METRIC

CROSS REFERENCE TO RELATED APPLICATION

This application is a 35 U.S.C. § 371 national stage application of PCT International Application No. PCT/EP2013/075066, filed on Nov. 29, 2013, the disclosure and content of which is incorporated by reference herein in its entirety. The above-referenced PCT International Application was published in the English language as International Publication No. WO 2015/078509 A1 on Jun. 4, 2015.

TECHNICAL FIELD

The present invention relates to methods for controlling operation of a cellular network and to corresponding devices.

BACKGROUND

In cellular networks, certain metrics may be used for control or monitoring purposes. For example, it is known to perform association of a user equipment (UE) to a particular cell using a metric which generally reflects the channel quality of between the UE and a base station serving the cell. For example, in the LTE (Long Term Evolution) radio technology specified by 3GPP ($3^{rd}$ Generation Partnership Project), cell association is typically done with metrics referred to as Reference Signal Received Power (RSRP) or Reference Signal Received Quality (RSRQ). The cell association using these metrics may involve selecting a cell to which the UE attaches, e.g., in idle mode, or performing a handover (HO) between two cells while maintaining an active data connection.

The RSRP and RSRQ procedures for their measurement are for example defined in 3GPP TS 36.214 V1.1.0 (2013 December). The cell association processes in idle mode are for example specified in 3GPP TS 36.133 V12.1.0 (2013 September) and 3GPP TS 36.304 V11.5.0 (2013 September). Procedures for active mode HOs are specified in 3GPP TS 36.331 V11.5.0 (2013 September).

The RSRP is defined to be measured by the UE as the linear average over the power contributions of the resource elements that carry cell-specific reference signals within the considered measurement frequency bandwidth.

The RSRQ is defined as the ratio N×RSRP/(E-UTRA carrier RSSI), where the E-UTRA carrier RSSI (Received Signal Strength Indicator) comprises the linear average of the total received power observed only in OFDM (Orthogonal Frequency Division Multiplexing) symbols containing reference symbols for antenna port 0, in the measurement bandwidth, over N resource blocks by the UE from all sources, including co-channel serving and non-serving cells, adjacent channel interference, thermal noise, etc.

A typical cell selection process may operate to select the cell for association which has the highest RSRP or RSRQ.

However, performing cell association by selecting the cell with the highest RSRP or RSRQ may in some scenarios provide undesirable results. For example, the cell with the highest RSRP or cells adjacent thereto may be highly loaded, which may adversely affect the performance when serving the UE in this cell, because the high load tends to cause more interference and unsatisfactory user experience. The RSRQ is sensitive to the traffic load in the cell and neighboring cells. Accordingly, since the instantaneous traffic load can fluctuate very quickly, selecting the cell with the highest RSRQ may result in unstable cell selection decisions, e.g., leading to ping-pong HOs.

Further, selecting the cell with the highest RSRP or RSRQ may be problematic in scenarios where the noise floor is different on different frequency channels and/or in different frequency bands, or is different between cells on the same frequency. This could be the case when the noise includes thermal noise and external interference from other radio systems operating on the same or on adjacent frequencies. For example some users of radio spectrum, e.g., TV broadcasters, do not use their allocated frequency bandwidth completely at all times and at all locations and leave certain regions of their allocated bandwidth unused at given locations. These unused spectra are referred to as "white spaces". Such white space spectrum can under certain circumstances be used by a cell of the cellular network. In such cases the interference situation on a channel in the white space spectrum may differ significantly from a channel in the spectrum which is dedicated to the cellular network, e.g., due to interference generated by the original user of the white space spectrum.

Further, selecting the cell with the highest RSRP or RSRQ may be problematic in heterogeneous network scenarios where a macro cell layer is deployed on one frequency channel and a pico cell layer is deployed on another frequency channel and these two frequency channels are located in different frequency bands. For example, the frequency channel of the pico cell layer may be located in a white space spectrum. Also in this case, the cells of the pico layer may experience an interference situation which differs significantly from that of the macro layer.

Still further, due to UE receiver imperfections RSRP measurements are likely to be biased by received interference and noise power. That is to say, the interference and noise may have the effect that the measured value of the RSRP does not accurately represent the strength of the reference signals, but is too high. This may have the effect that a cell having a stronger impact from interference and noise is preferred over a cell with otherwise equal or even higher RSRP. This is of course not desirable.

Also in the case of other control purposes, usage of the RSRP or RSRQ may be problematic if the interference situation varies significantly between different cells or spectra utilized by the cellular network.

Accordingly, there is a need for techniques which allow for improved control of cellular network operation.

SUMMARY

According to an embodiment of the invention, a method for controlling cellular network operation is provided. According to the method, a node of a cellular network obtains a metric. The metric is defined as a ratio of a first value and a second value. The first value represents the strength of a reference signal transmitted by a base station of a cell of the cellular network, as measured by a UE. The second value represents the strength of interference at the UE. Depending on the metric, the node controls a radio access configuration of the UE and the cell.

According to a further embodiment of the invention, a method for controlling cellular network operation is provided. According to the method, a UE obtains a metric. The metric is defined as a ratio of a first value and a second value. The first value represents the strength of a reference signal transmitted by a base station of a cell of a cellular network, as measured by the UE. The second value represents the strength of interference at the UE. Depending on the metric, the UE controls a radio access configuration of the UE and the cell.

According to a further embodiment of the invention a node for a cellular network is provided. The node comprises an interface for controlling a radio access configuration of a UE and a cell. Further, the node comprises at least one processor. The at least one processor is configured to obtain a metric. The metric is defined as a ratio of a first value and a second value. The first value represents the strength of a reference signal transmitted by a base station of the cell, as measured by the UE. The second value represents the strength of interference at the UE. Further, the at least one processor is configured to control the radio access configuration of the UE and the cell depending on the metric.

According to a further embodiment of the invention, a UE for a cellular network is provided. The UE comprises a radio interface for connecting to the cellular network. Further, the UE comprises at least one processor. The at least one processor is configured to obtain a metric. The metric is defined as a ratio of a first value and a second value. The first value represents the strength of a reference signal transmitted by a base station of a cell of the cellular network, as measured by the UE. The second value represents the strength of interference at the UE. Further, the at least one processor is configured to control a radio access configuration of the UE and the cell depending on the metric.

According to a further embodiment of the invention, a computer program or non-transitory computer program product, e.g., in the form of a tangible storage medium, is provided. The computer program or computer program product comprises program code to be executed by at least one processor of a node for a cellular network. Execution of the program code causes the at least one processor to obtain a metric. The metric is defined as a ratio of a first value and a second value. The first value represents the strength of a reference signal transmitted by a base station of a cell of the cellular network, as measured by the UE. The second value represents the strength of interference at the UE. Further, execution of the program code causes the at least one processor to control a radio access configuration of the UE and the cell depending on the metric.

According to a further embodiment of the invention, a computer program or non-transitory computer program product, e.g., in the form of a tangible storage medium, is provided. The computer program or computer program product comprises program code to be executed by at least one processor of a UE for a cellular network. Execution of the program code causes the at least one processor to obtain a metric. The metric is defined as a ratio of a first value and a second value. The first value represents the strength of a reference signal transmitted by a base station of a cell of a cellular network, as measured by the UE. The second value represents the strength of interference at the UE. Further, execution of the program code causes the at least one processor to control a radio access configuration of the UE and the cell depending on the metric.

DETAILED DESCRIPTION OF EMBODIMENTS

In the following, concepts according to embodiments of the invention will be explained in more detail by referring to the accompanying drawings. The illustrated concepts relate to procedures operation of a UE in a cellular network, in particular for controlling a radio access configuration for the UE and a cell of the cellular network. For example, such control may involve association of the UE to the cell or control of carrier utilization by the UE and the cell. The UE may be a mobile phone, smartphone, wireless data modem, portable or stationary computer, or the like. In the illustrated examples, the cellular network is assumed to be based on the LTE radio technology. However, it is to be understood that the illustrated concepts could be applied in a corresponding manner to other types of cellular networks, using additional or other types of radio technology and/or other types of network infrastructure, e.g., nodes having other functionalities and/or designations.

Figure 1:
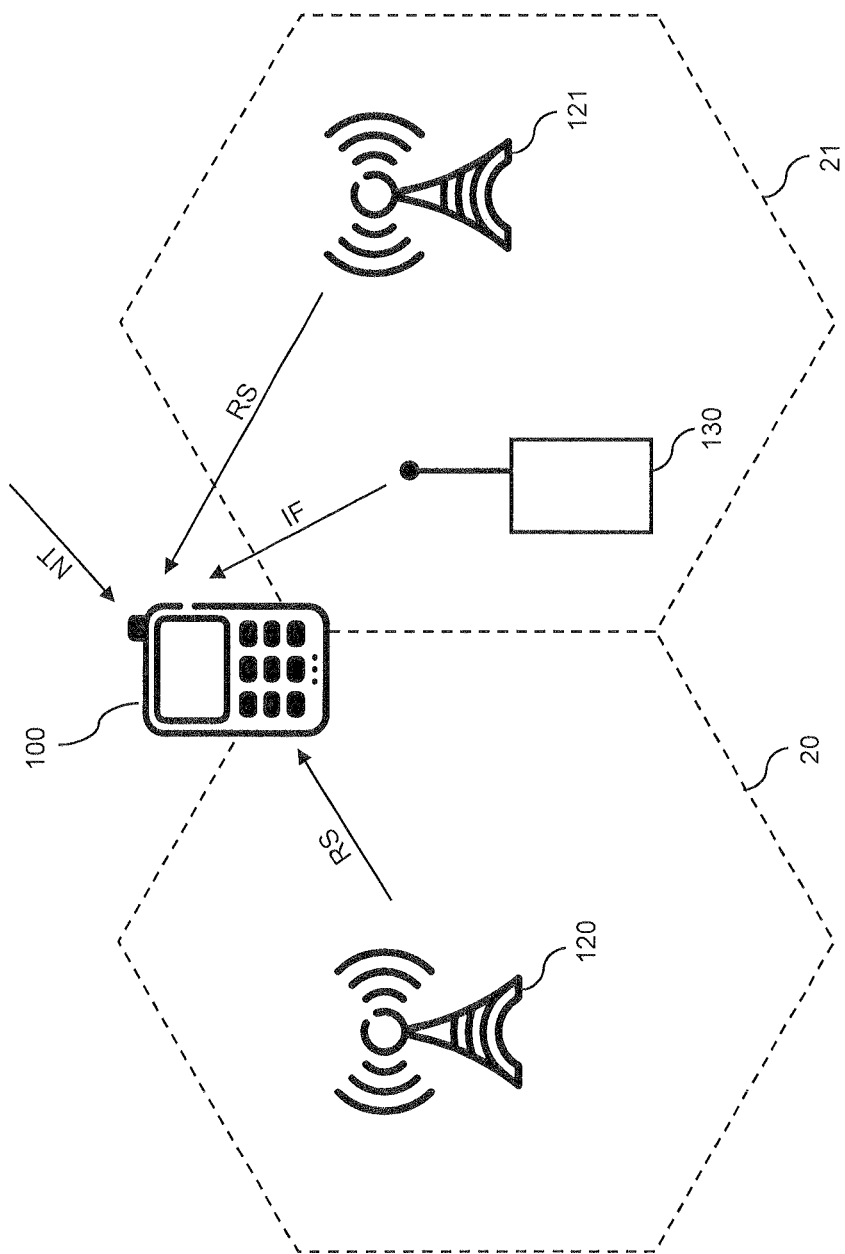
FIG. 1 schematically illustrates a cellular network environment for applying processes of controlling a radio access configuration for a UE and a cell, using an interference-based metric according to an embodiment of the invention.

FIG. 1 schematically illustrates structures of the cellular network and a UE 100 which may connect to the cellular network. By way of example, FIG. 1 shows a first cell 20 and a second cell 21. A first base station 120 is responsible for serving the first cell 20, and a second base station 121 is responsible for serving the second cell 21. In accordance with the terminology established for the LTE radio technology, the base stations 120, 121 will in the following also be referred to as eNB ("evolved Node B"). In the LTE radio technology, the base stations 120, 121 are not only responsible for serving cells, i.e., conveying data over a radio interface to or from one or more UEs connected to the cell, but may in some cases also be involved in performing network-based cell association. For example, a HO of the UE 100 from the first cell 20 to the second cell 21 may be accomplished by interaction between the first base station 120 and the second base station 121. In some cases, also further nodes of the cellular network could be involved in the HO procedure, e.g., a more centralized mobility controller referred to as MME (Mobility Management Entity). Accordingly, in the illustrated example the base stations 120, 121 also represent nodes of the cellular network which may perform association of the UE 100 to a cell. However, in other cellular network deployments, the latter functionality could also be implemented separately from a base station. Still further, the base stations may also control utilization of carriers by the UEs and the cell, e.g., using carrier aggregation as specified in 3GPP TS 36.300 V11.7.0 (2013 September), or coordinate association of a UE to multiple cells, e.g., simultaneously to the cells 20, 21. Moreover, the base stations 120, 121 may also be responsible for controlling scheduling of data transmissions between the cellular network and the UE. Further, the base stations 120, 121 may be involved in monitoring processes for purposes of network optimization, e.g., by reporting measurements. Still further, the base stations may be involved in coordination of multicast transmissions by multiple cells of the cellular network, e.g., by the cells 20, 21.

As used herein, the process of controlling a radio access configuration is intended to cover various kinds of control operations with respect to the UE and/or with respect to the base station. In some cases such control operations may also affect further UEs. Similarly, the control operations may also affect further base stations (or a radio access network (RAN) part of the cellular network).

An example of such control operations is cell association, i.e., association of the UE to the cell or to multiple cells. As used herein, the process of associating the UE to one or more of the cells of a cellular network is intended to cover different processes of selecting a cell for the UE. For example, the UE may select a cell and then attach to it, without having an active connection to the cellular network. In this case, the UE would be associated to the cell and registered at the base station of the cell and for example receive paging information from the base station. The UE may also reselect the cell to which it is already attached. Further, the UE may select the cell from a plurality of cells. Further, the UE may perform a HO from one cell to another cell while maintaining an active connection to the cellular network, thereby association to the further cell. In the case of such HOs, the actual cell association decision may be network based, e.g., be performed by the base station currently serving the UE or by another node of the cellular network, e.g., an MME. Further, the process of associating the UE is intended to cover processes in which the UE is associated to multiple cells. In the latter case, the control operation may for example include addition, removal, or change of one of the cells the UE is associated to.

A further example of such control operations is control of carrier utilization. For example, when using carrier aggregation as specified by 3GPP TS 36.300, the UE may be connected to a primary cell (also referred to as PCell) and to one or more secondary cells (also referred to as SCell). Here, the PCell and SCell specify frequency ranges corresponding to one carrier. Accordingly, carrier aggregation allows for utilizing multiple carriers between the UE and the cell. These carriers may be from different regions of the radio spectrum. The control operation may for example configure the cell and UE to start or stop using a certain carrier (SCell).

A further example of such control operations is control of scheduling or traffic routing. In the case of carrier aggregation for example, the control operation may include selection of the carrier (PCell or SCell) for scheduling and transmission of data. In the case of connectivity to multiple cells for example, the control operation may involve selection of the cell which is used for scheduling and transmission of data, i.e., via which cell(s) data is routed between the UE and the cellular network. These control operations may also involve selection of a node which performs the scheduling, e.g., a certain base station.

A further example of such control operations is control of measurement configurations. For network optimization purposes, various measurements may be used, which may be performed by the UE or by the RAN, e.g., by base stations. The measurements may be reported to a management entity, e.g., implemented in a corresponding node of the cellular network. In this case control operations may for example involve configuration of the UE or of the BS to perform and report a certain measurement, e.g., by specifying a metric to be reported, starting measurements required to obtain the metric, defining a event for triggering reporting of the metric.

A further example of such control operations is coordination of multicast transmissions. An example of such multicast transmissions are Multimedia Broadcast Multicast Service (MBMS) transmissions as for example specified in 3GPP TS 36.300. In such cases, the control operation may for example involve selecting a modulation and coding scheme (MCS) for an area to be covered by the multicast transmissions, also referred to as MBMS Single Frequency Network (MBSFN) area. Accordingly, the control operation may also pertain to other base stations in this MBSFN area. The control operation may also involve selecting cells (or base stations) to participate in the multicast transmission, e.g., by defining the MBSFN area.

In the concepts as illustrated herein, the control of the radio access configuration is performed depending on an interference-based metric. The metric is defined as a ratio between a first value and a second value. The first value represents the strength of a reference signal transmitted by a base station of the cell as measured by the UE. The second value represents the strength of interference at the UE. As the first value, the RSRP may be used. The second value may in particular represent noise and interference from outside the cellular network, e.g., the sum of interference from sources which are not part of the cellular network and thermal noise.

Specifically the interference-based metric may be calculated as:

$$eRSRP=RSRP/INext, \quad (1)$$

where INext represents the strength of interference from outside the cellular network, including thermal noise.

In the following, the concepts will be explained in more detail by referring to examples in which the metric is used for cell association processes in a scenario as illustrated in FIG. 1. However, it is to be understood that the metric can also be used for other purposes, such as in the above-mentioned exemplary control operations.

FIG. 1 also illustrates an exemplary source 130 of interference IF from outside the cellular network, in the following also referred to as external interference. For example, in a scenario with white spectrum usage by one of the cells 20, 21 the source 130 could be a primary user of the opportunistically used spectrum. Further, FIG. 1 also schematically illustrates the thermal noise NT. Both the external interference IF and the thermal noise NT may influence the performance of the UE 100 in the cells 20, 21. Further, the impact of the external interference IF and the thermal noise NT may differ between the cells 20, 21. For example, in the illustrated scenario the source 130 of external interference is depicted as being located in the coverage region of the second cell 21. Accordingly, the impact of the external interference IF may be stronger in the second cell 21. Further, the second cell 21 could opportunistically use the same spectrum as the source 130, resulting in a stronger impact of the external interference IF than in the first cell 20. By performing the cell association depending on the eRSRP, this may be taken into account in an efficient manner.

For illustration of the benefits of the eRSRP, a scenario can be assumed in which the actual strength of reference signals RS transmitted by the first base station 120 as observed at the UE 100 is higher than the actual strength of reference signals RS transmitted by the second base station 121 as observed at the UE 100. Further assuming that the external interference IF is higher in the second cell 21, it can be expected that the UE 100 will perform better in the first cell 20. However, the RSRP as measured by the UE 100 may be biased by the external IF, resulting in a value of the RSRP being higher for the second cell 21 than for the first cell 20. When selecting the cell 20, 21 with the highest RSRP, the UE 100 would thus be associated to the second cell 21, which in the illustrated scenario results in inferior performance as compared to associating the UE 100 to the first cell 20. In the eRSRP, the effect of the increased external interference IF is however compensated. Accordingly, when selecting the cell 20, 21 with the highest eRSRP, the first cell 20 would be selected, which in the illustrated scenario provides a better performance for the UE 100.

For determining the eRSRP, different ways of assessing the external interference IF may be used. For example, the strength of the external interference IF and the thermal noise NT could be measured by the UE 100. Together with the measurement of the RSRP by the UE 100, the UE 100 may then calculate the eRSRP and use its value for cell association. Further, the UE 100 could also report the measured value of the external interference IF and the thermal noise NT and the measured RSRP to the cellular network, and a node of the cellular network, e.g., one of the base stations 120, 121 could calculate the eRSRP and use its value for cell association. The strength of the external interference IF and the thermal noise NT could also be measured by a node of the cellular network, e.g., by one of the base stations 120, 121 and then be used together with the reported measurement of the RSRP for calculating the eRSRP. The measurement of the external interference IF and the thermal noise NT may for example be done by a base station of a cell which is affected by the external interference IF. For example, if such cell is considered as a candidate target cell for a HO, the base station of the cell currently serving the UE 100 could request the measurement from the base station of the considered candidate target cell.

Further, the strength of the external interference IF and the thermal noise NT could be obtained from a database, e.g., with location specific records storing the strength of the external interference IF and the thermal noise NT. The values stored in the database may be empirical, i.e., based on earlier measurements, and/or may be predicted, e.g., using a model.

Also existing databases could be used for this purpose, e.g., as discussed within the scope of TV White Space or Licensed Shared Access concepts for assessing whether secondary use of a spectrum is safe.

Further, also the calculated value of the eRSRP could be reported. For example, the UE 100 could report the eRSRP to the cellular network, to be used by a node of the cellular network for performing cell association. Alternatively, a node of the cellular network, e.g., one of the base stations 120, 121, could report the eRSRP to the UE 100, to be used by the UE 100 for performing cell association. Still further, the eRSRP could also be reported between different nodes of the cellular network, e.g., between the base stations 120, 121 or from one of the base stations 120, 121 to another node of the cellular network.

The measurements of the external interference IF and the thermal noise NT may be coordinated to facilitate distinguishing the external interference IF from the internal interference within the cellular network. For example, this may be achieved by performing the measurement in a time interval with restricted radio activity of the cellular network, e.g., in time intervals are not used by certain cells of the cellular network for sending data, e.g., in an Almost Blank Subframes (ABS).

In some implementations, also one or more other metrics may be available for performing the cell association, e.g., the RSRP or RSRQ. In such cases, the UE or node of the cellular network which performs the cell association may select between performing the cell association depending on the eRSRP or depending on another metric.

This selection may be based on a default configuration or manual configuration of the UE or node of the cellular network.

In addition or as an alternative, this selection may be based on the strength of the external interference IF or an estimate thereof, e.g., on the above measurement of the external interference IF and the thermal noise NT. Other estimates could be used as well, a difference in noise power level between two different frequency channels or locations. The usage of the eRSRP may be preferred over the RSRP or RSRQ if the estimated strength of the external interference IF or its frequency or location dependant variation exceeds a threshold.

In addition or as an alternative, the selection whether to use the eRSRP or another metric could be based on a load of the involved cell or cells or a load trend, i.e., whether the load increases or decreases. The load could for example be represented in terms of the fraction of used radio resources from the available radio resources.

In addition or as an alternative, the selection whether to use the eRSRP or another metric could be based on previous cell association processes, e.g., a number of HO failures or cell attach failures in a given time interval or an estimated trend of such number.

In the following exemplary cell selection processes using the eRSRP will be explained in more detail with reference to FIGS. 2 to 10. These processes involve the UE 100, the first base station 120, referred to as eNB1, and the second base station 121, referred to as eNB2. The processes of FIGS. 7 and 8 further involve a database 140.

Figure 2:
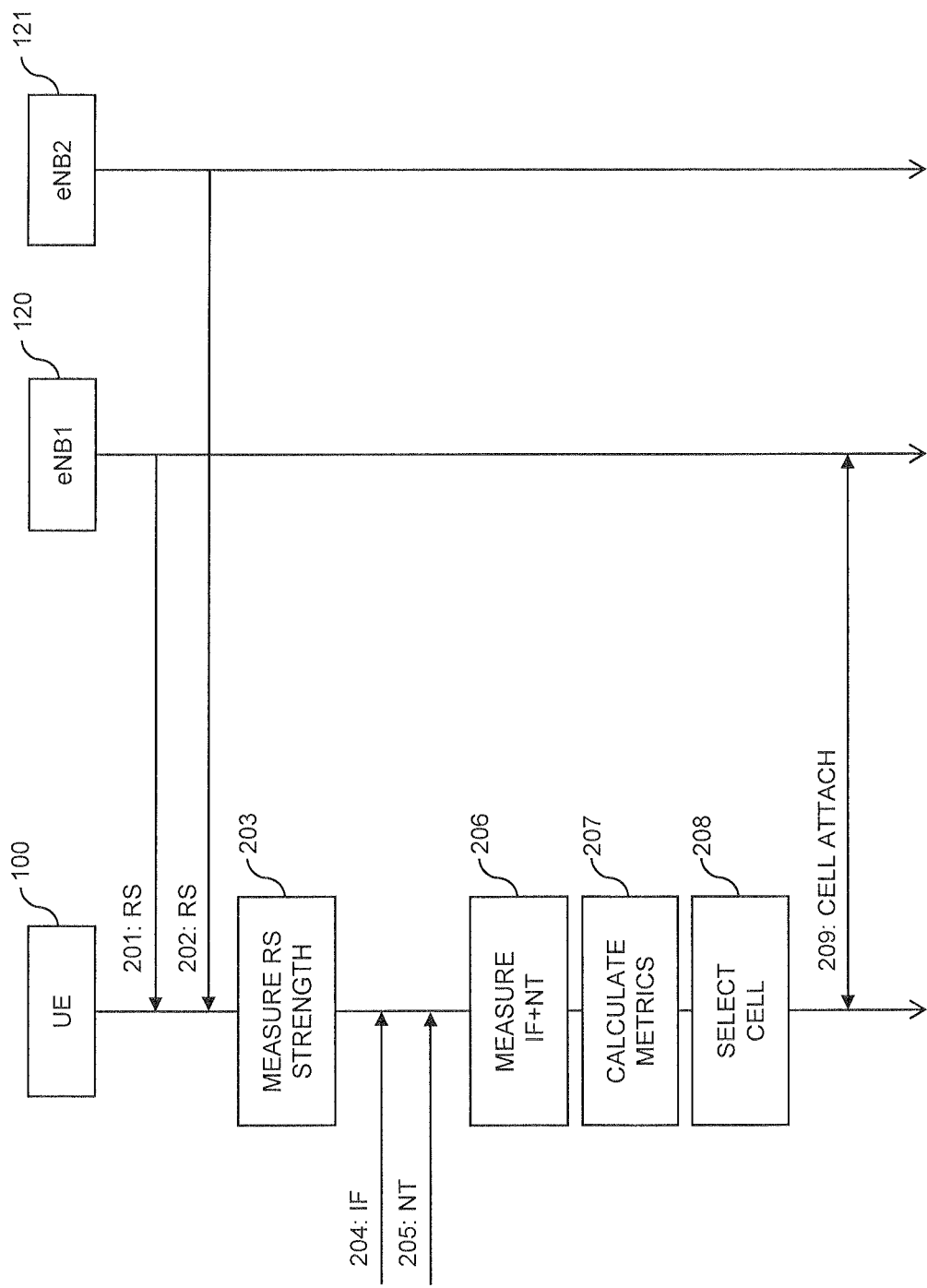
FIG. 2 illustrates an exemplary cell association process according to an embodiment of the invention, in which the metric is calculated by the UE and cell selection is performed by the UE.

In the process of FIG. 2, cell association is performed by the UE 100. A corresponding process may for example be performed when the UE 100 initially attaches to the cellular network, e.g., after being switched on in the coverage area of cells 20, 21. Further, a corresponding process may be performed when the UE 100 is in idle mode and selects a new cell.

As illustrated by 201, 202 the first base station 120 and the second base station 121 transmit reference signals RS, e.g., using cell specific reference symbols. As illustrated by step 203, the reference signals RS are measured by the UE 100. Specifically, the UE 100 measures the strength of the reference signals RS, e.g., in terms of the RSRP.

As further illustrated by 204, 205, the UE 100 also receives external interference IF and thermal noise NT. At step 206, the UE 100 measures the strength of the external interference IF and the thermal noise NT, i.e., the value Next. The configuration of the measurement in step 206 may be based on information stored in the UE 100, e.g., by default or manually set. Further, the configuration of the measurement in step 206 may be based on information provided by the cellular network, e.g., in broadcasted system information or by dedicated control signaling. Such information may also define one or more time intervals for performing the measurement. To facilitate distinction of the external interference IF and thermal noise NT from the radio signals transmitted in the thermal network, such time intervals may be determined to correspond to time intervals with restricted radio activity of the cellular network, e.g., ABSs.

At step 207, the UE 100 calculates the eRSRP for the cell 20 of the first base station 120 and the eRSRP for the cell 21 of the second base station 121, using relation (1).

At step 208, the UE 100 performs cell selection depending on the values of the eRSRP obtained at step 207. In particular, the UE 100 selects the cell 20, 21 with the highest eRSRP, which in the illustrated example is assumed to be the first cell 20.

Having selected the first cell 20, the UE 100 attaches to first cell 20, as illustrated by 209. As a result, the UE 100 is then associated to the first cell 20.

Figure 3:
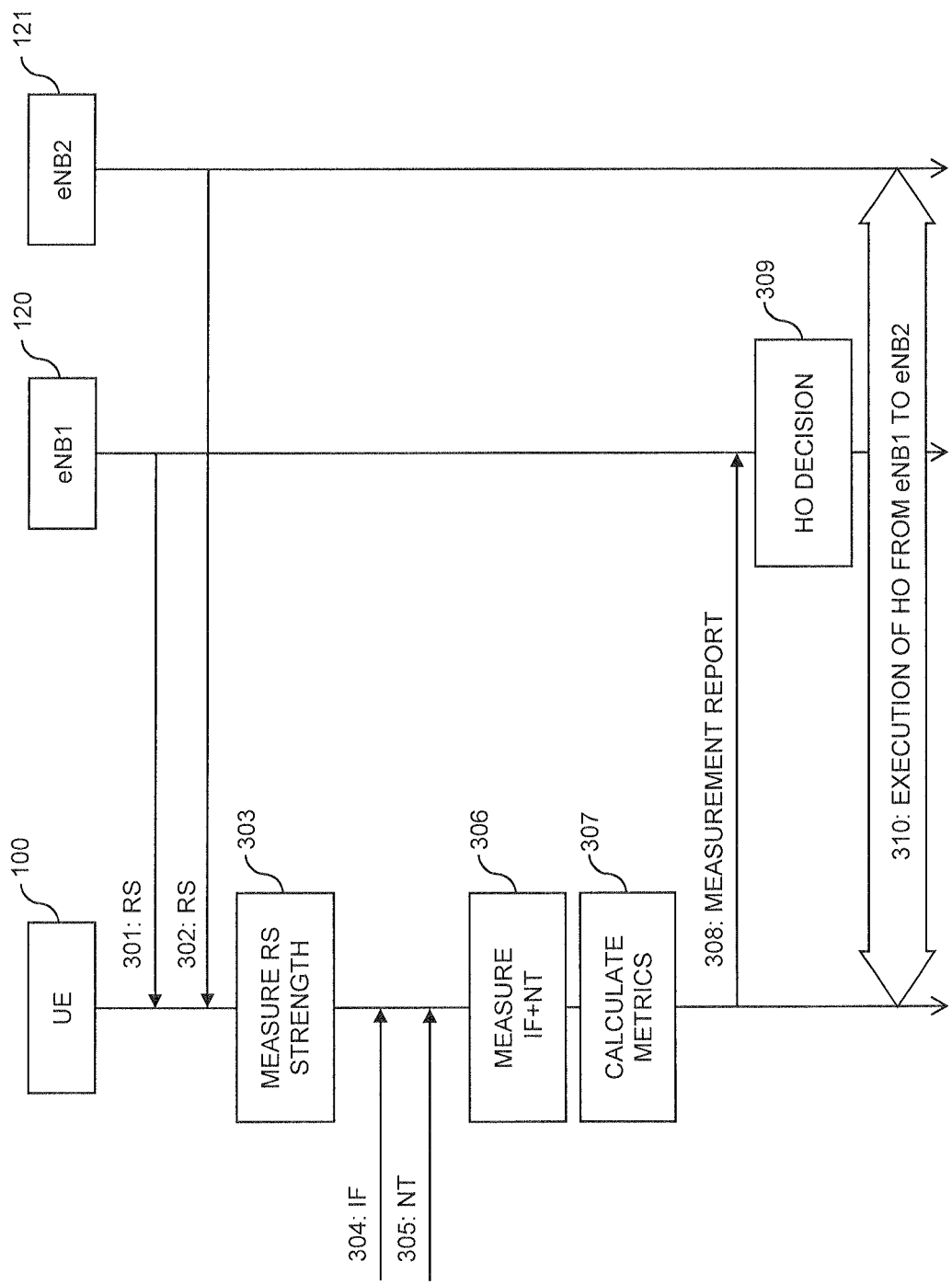
FIG. 3 illustrates an exemplary cell association process according to an embodiment of the invention, in which the metric is calculated by the UE and cell selection is performed by a node of the cellular network.

In the process of FIG. 3, cell association is network based and performed by the first base station 120. Specifically, the process of FIG. 3 involves a HO of the UE 100 from the first cell 20, served by the first base station 120, to the second cell 21, served by the second base station 121. Accordingly, the UE 100 is assumed to be initially connected to the first cell 20.

As illustrated by 301, 302 the first base station 120 and the second base station 121 transmit reference signals RS, e.g., using cell specific reference symbols. As illustrated by step 303, the reference signals RS are measured by the UE 100. Specifically, the UE 100 measures the strength of the reference signals RS, e.g., in terms of the RSRP.

As further illustrated by 304, 305, the UE 100 also receives external interference IF and thermal noise NT. At step 306, the UE 100 measures the strength of the external interference IF and the thermal noise NT, i.e., the value Next. The configuration of the measurement in step 306 may be based on information stored in the UE 100, e.g., by default or manually set. Further, the configuration of the measurement in step 306 may be based on information provided by the cellular network, e.g., in broadcasted system information or by dedicated control signaling. Such information may also define one or more time intervals for performing the measurement. To facilitate distinction of the external interference IF and thermal noise NT from the radio signals transmitted in the thermal network, such time intervals may be determined to correspond to time intervals with restricted radio activity of the cellular network, e.g., ABSs.

At step 307, the UE 100 calculates the eRSRP for the cell 20 of the first base station 120 and the eRSRP for the cell 21 of the second base station 121, using relation (1).

The UE 100 then sends a measurement report 308 indicating the calculated values of the eRSRP to the first base station 120.

At step 309, the first base station 120 performs cell selection depending on the values of the eRSRP obtained from the measurement report 308. In particular, the first base station 120 selects the cell 20, 21 with the highest eRSRP, which in the illustrated example is assumed to be the second cell 21.

Having selected the second cell 21, the first base station 120 initiates execution of a HO of the UE 100 from the first cell 20 to the second cell 21, as indicated by 310. After completion of the HO, the UE 100 is associated to the second cell 21.

Figure 4:
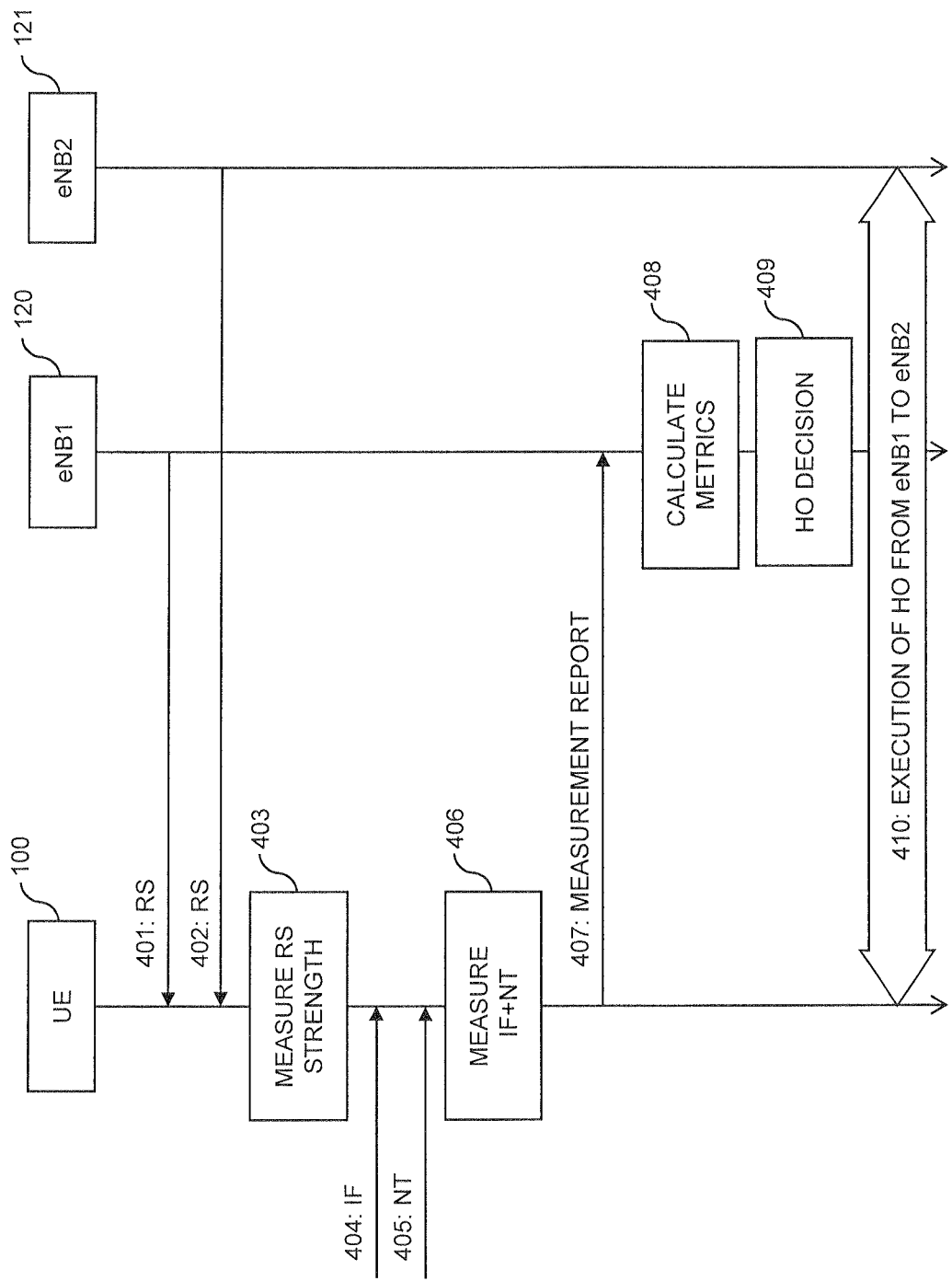
FIG. 4 illustrates an exemplary cell association process according to an embodiment of the invention, in which the metric is calculated by a node of the cellular network, using measurements performed by the UE, and cell selection is performed by the node of the cellular network.

Also in the process of FIG. 4, cell association is network based and performed by the first base station 120. Similar to FIG. 3, the process of FIG. 4 involves a HO of the UE 100 from the first cell 20, served by the first base station 120, to the second cell 21, served by the second base station 121. Accordingly, the UE 100 is assumed to be initially connected to the first cell 20. However, in the process of FIG. 4 the calculation of the eRSRP is performed in the cellular network, in particular by the first base station 120 which serves the UE 100 before the HO. The calculation of the eRSRP is based on measurements reported by the UE 100.

As illustrated by 401, 402 the first base station 120 and the second base station 121 transmit reference signals RS, e.g., using cell specific reference symbols. As illustrated by step 403, the reference signals RS are measured by the UE 100. Specifically, the UE 100 measures the strength of the reference signals RS, e.g., in terms of the RSRP.

As further illustrated by 404, 405, the UE 100 also receives external interference IF and thermal noise NT. At step 406, the UE 100 measures the strength of the external interference IF and the thermal noise NT, i.e., the value Next. The configuration of the measurement in step 406 may be based on information stored in the UE 100, e.g., by default or manually set. Further, the configuration of the measurement in step 406 may be based on information provided by the cellular network, e.g., in broadcasted system information or by dedicated control signaling. Such information may also define one or more time intervals for performing the measurement. To facilitate distinction of the external interference IF and thermal noise NT from the radio signals transmitted in the thermal network, such time intervals may be determined to correspond to time intervals with restricted radio activity of the cellular network, e.g., ABSs.

The UE 100 then sends a measurement report 407 to the first base station 120. The measurement report 407 indicates the measured values of the RSRP from step 403 and INext as measured at step 406. In some implementations, the values of the RSRP from step 403 and INext from step 406 may also be indicated in separate measurement reports.

At step 408, the first base station 120 calculates the eRSRP for the cell 20 of the first base station 120 and the eRSRP for the cell 21 of the second base station 121 from the values of the RSRP and INext as obtained from the measurement report 407, using relation (1).

At step 409, the first base station 120 performs cell selection depending on the values of the eRSRP obtained at step 408. In particular, the first base station 120 selects the cell 20, 21 with the highest eRSRP, which in the illustrated example is assumed to be the second cell 21.

Having selected the second cell 21, the first base station 120 initiates execution of a HO of the UE 100 from the first cell 20 to the second cell 21, as indicated by 410. After completion of the HO, the UE 100 is associated to the second cell 21.

Figure 5:
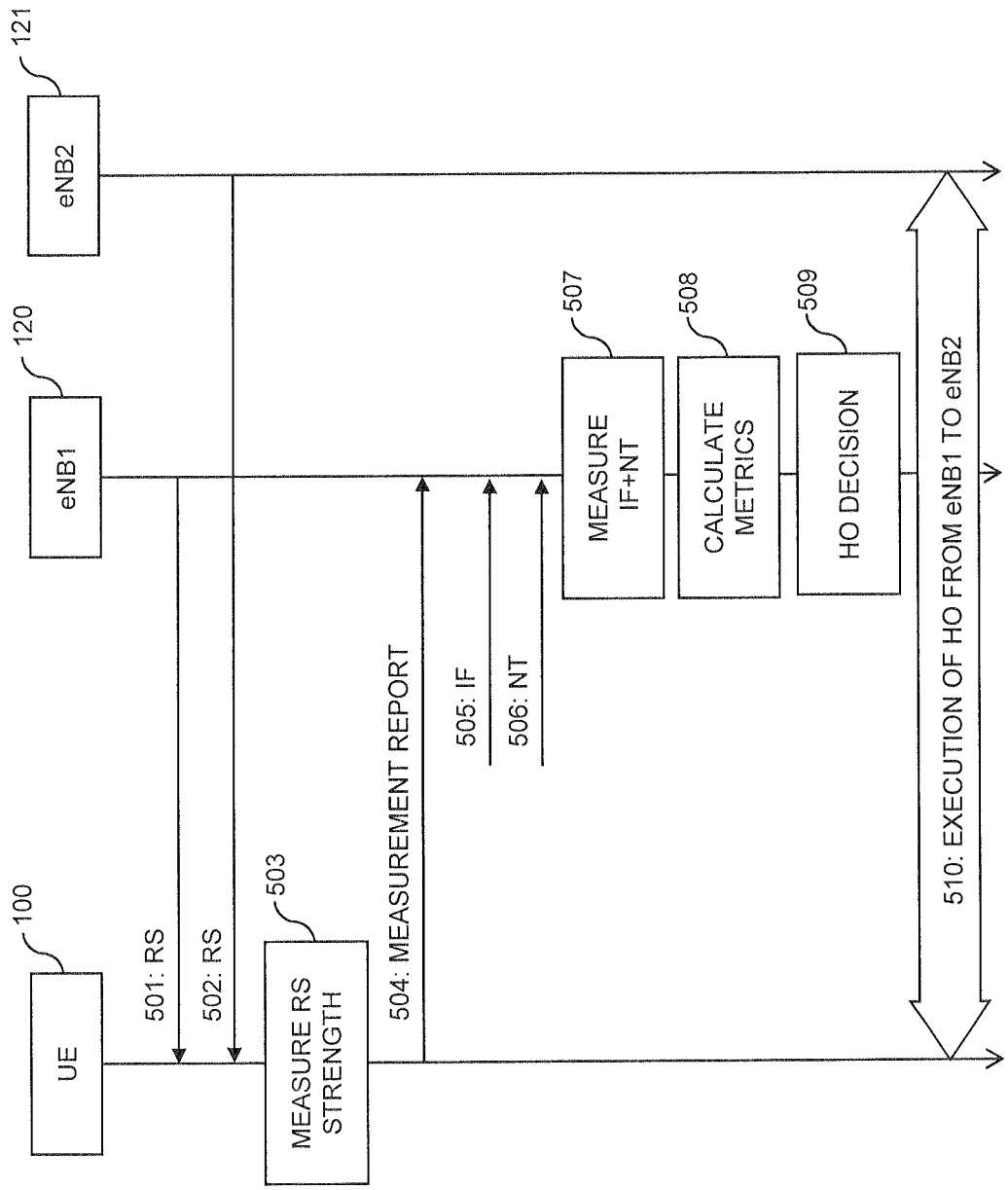
FIG. 5 illustrates an exemplary cell association process according to an embodiment of the invention, in which the metric is calculated by a node of the cellular network, using measurements performed by the UE and by the node, and cell selection is performed by the node of the cellular network.

Also in the process of FIG. 5, cell association is network based and performed by the first base station 120. Similar to FIGS. 3 and 4, the process of FIG. 5 involves a HO of the UE 100 from the first cell 20, served by the first base station 120, to the second cell 21, served by the second base station 121. Accordingly, the UE 100 is assumed to be initially connected to the first cell 20. Similar to the process of FIG. 4 the calculation of the eRSRP is performed in the cellular network, in particular by the first base station 120 which serves the UE 100 before the HO. However, in this case the calculation of the eRSRP is based on a measurement of the external interference IF and thermal noise NT performed in the cellular network, in particular by the first base station 120.

As illustrated by 501, 502 the first base station 120 and the second base station 121 transmit reference signals RS, e.g., using cell specific reference symbols. As illustrated by step 503, the reference signals RS are measured by the UE 100. Specifically, the UE 100 measures the strength of the reference signals RS, e.g., in terms of the RSRP.

The UE 100 then sends a measurement report 504 to the first base station 120. The measurement report 504 indicates the measured values of the RSRP from step 503.

As further illustrated by 505, 506, the first base station 120 receives external interference IF and thermal noise NT. At step 507, the UE 100 measures the strength of the external interference IF and the thermal noise NT, i.e., the value Next. The configuration of the measurement in step 507 may be based on information stored in the first base station, e.g., by default or manually set. Further, the configuration of the measurement in step 507 may be based on information provided by another node of the cellular network, e.g., another base station or a control node. Such information may also define one or more time intervals for performing the measurement. To facilitate distinction of the external interference IF and thermal noise NT from the radio signals transmitted in the thermal network, such time intervals may be determined to correspond to time intervals with restricted radio activity of the cellular network, e.g., ABSs.

At step 508, the first base station 120 calculates the eRSRP for the cell 20 of the first base station 120 and the eRSRP for the cell 21 of the second base station 121 from the values of the RSRP as obtained from the measurement report 504 and from INext as obtained from step 507, using relation (1).

At step 509, the first base station 120 performs cell selection depending on the values of the eRSRP obtained at step 408. In particular, the first base station 120 selects the cell 20, 21 with the highest eRSRP, which in the illustrated example is assumed to be the second cell 21.

Having selected the second cell 21, the first base station 120 initiates execution of a HO of the UE 100 from the first cell 20 to the second cell 21, as indicated by 510. After completion of the HO, the UE 100 is associated to the second cell 21.

Figure 6:
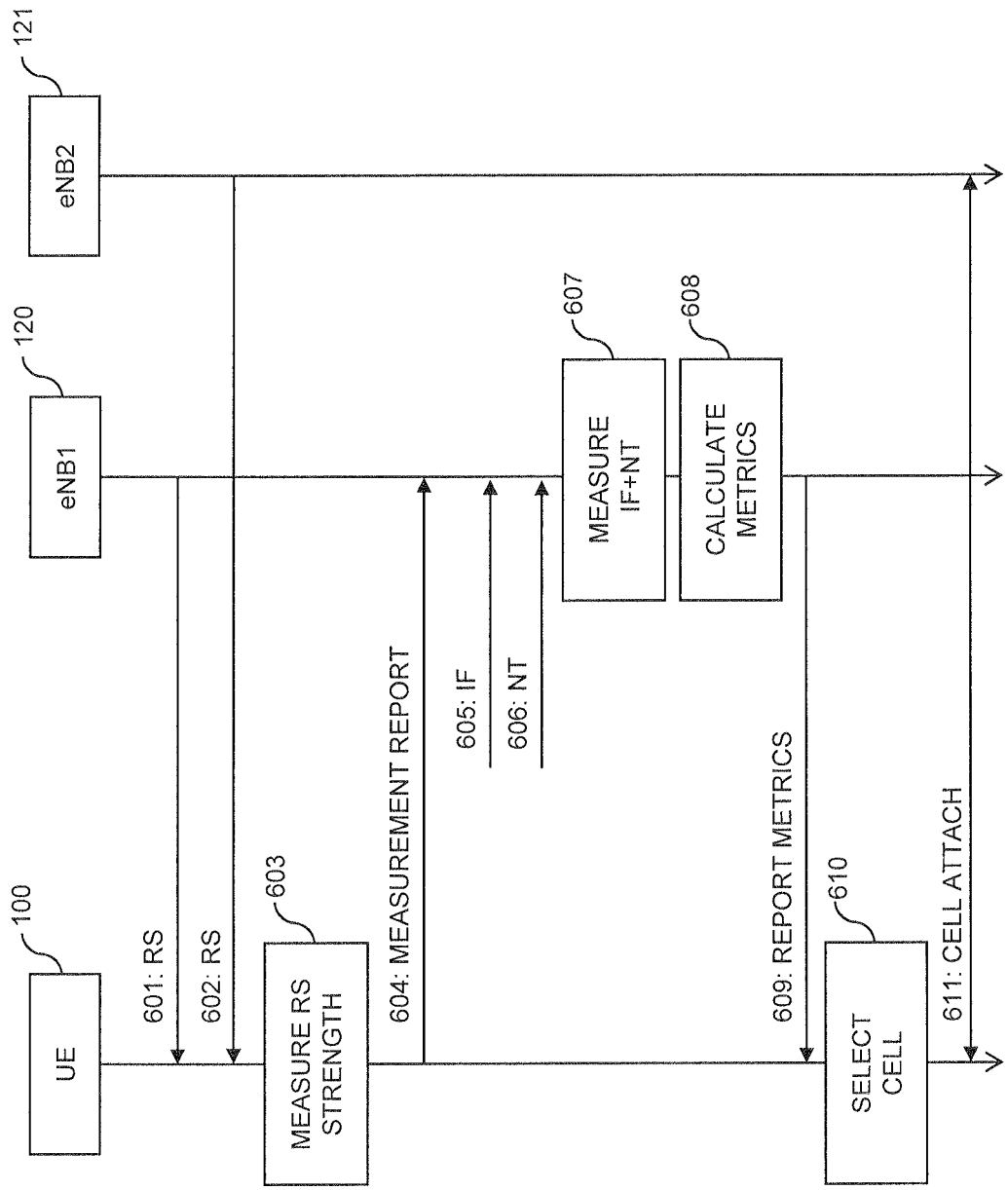
FIG. 6 illustrates an exemplary cell association process according to an embodiment of the invention, in which the metric is calculated by a node of the cellular network, using measurements performed by the UE and by the node, and cell selection is performed by the UE.

In the process of FIG. 6, cell association is performed by the UE 100. Similar to FIG. 2, a corresponding process may for example be performed when the UE 100 is in idle mode and selects a new cell, while being attached to the first cell 20. The measurements and calculations for obtaining the values of the eRSRP are performed in a similar manner as in the process of FIG. 5, i.e., the calculation of the eRSRP is performed in the cellular network, in particular by the first base station 120. Also in this case the calculation of the eRSRP is based on a measurement of the external interference IF and thermal noise NT performed in the cellular network, in particular by the first base station 120. However, the calculated eRSRP is not used by the first base station 120 for cell selection, but reported to the UE 100.

As illustrated by 601, 602 the first base station 120 and the second base station 121 transmit reference signals RS, e.g., using cell specific reference symbols. As illustrated by step 603, the reference signals RS are measured by the UE 100. Specifically, the UE 100 measures the strength of the reference signals RS, e.g., in terms of the RSRP.

The UE 100 then sends a measurement report 604 to the first base station 120. The measurement report 604 indicates the measured values of the RSRP from step 603.

As further illustrated by 605, 606, the first base station 120 receives external interference IF and thermal noise NT. At step 607, the first base station 120 measures the strength of the external interference IF and the thermal noise NT, i.e., the value Next. The configuration of the measurement in step 607 may be based on information stored in the first base station 120, e.g., by default or manually set. Further, the configuration of the measurement in step 607 may be based on information provided by another node of the cellular network, e.g., another base station or a control node. Such information may also define one or more time intervals for performing the measurement. To facilitate distinction of the external interference IF and thermal noise NT from the radio signals transmitted in the thermal network, such time intervals may be determined to correspond to time intervals with restricted radio activity of the cellular network, e.g., ABSs.

At step 608, the first base station 120 calculates the eRSRP for the cell 20 of the first base station 120 and the eRSRP for the cell 21 of the second base station 121 from the values of the RSRP as obtained from the measurement report 604 and from INext as obtained from step 607, using relation (1).

The first base station then sends a report 609 to the UE 100. The report indicates the values of the eRSRP from step 608. The report 609 may for example be sent in an idle mode signaling message, e.g., in a paging message.

At step 610, the UE 100 performs cell selection depending on the values of the eRSRP obtained at from the report 609. In particular, the first base station 120 selects the cell 20, 21 with the highest eRSRP, which in the illustrated example is assumed to be the second cell 21.

Having selected the second cell 21, the first base station 120 attaches to the second cell 21, as indicated by 611. As a result, the UE 100 is then associated to the second cell 21.

Figure 7:
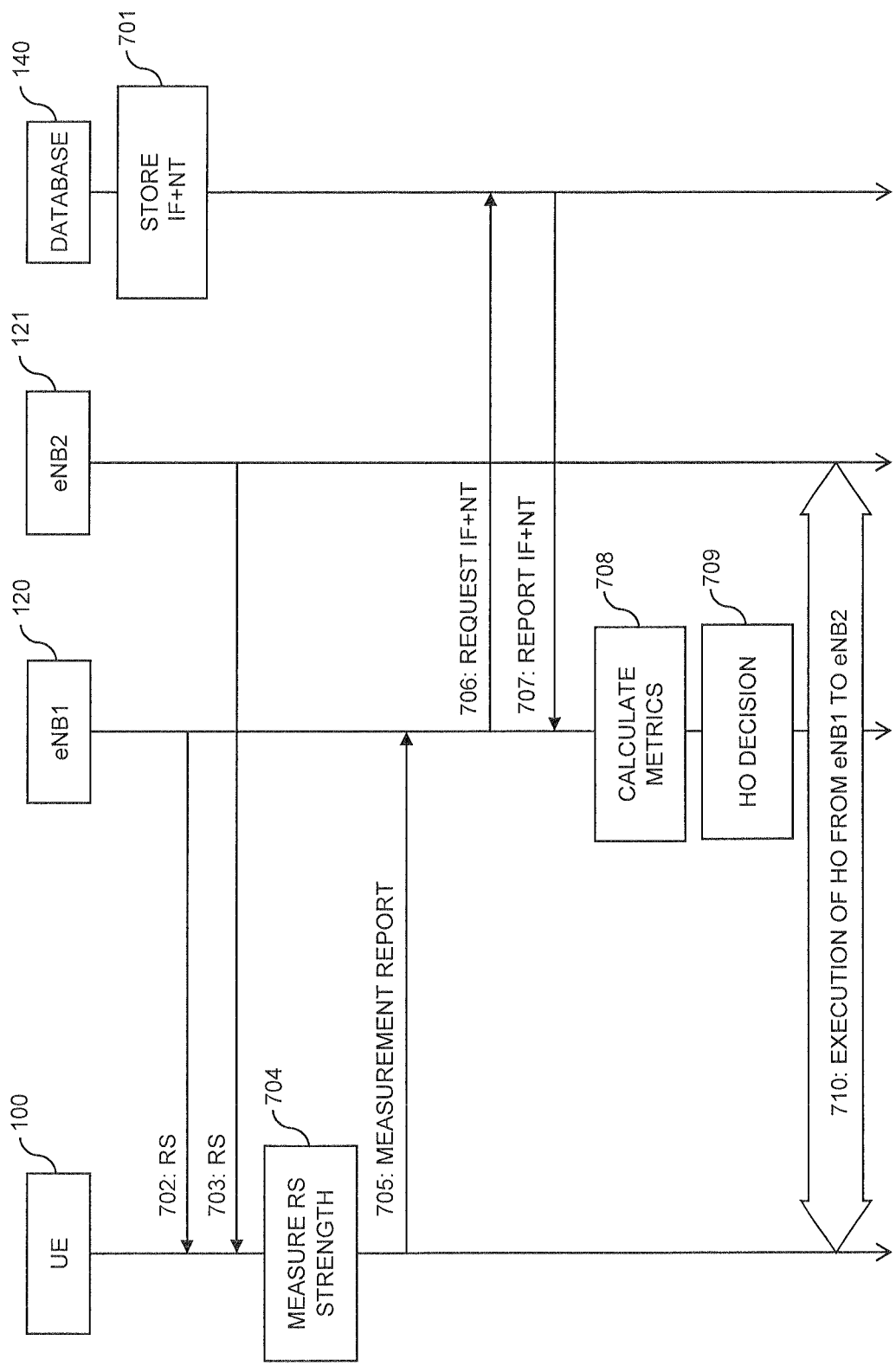
FIG. 7 illustrates an exemplary cell association process according to an embodiment of the invention, in which the metric is calculated by a node of the cellular network, using measurements performed by the UE and information from a database, and cell selection is performed by the node of the cellular network.

In the process of FIG. 7, cell association is network based and performed by the first base station 120. Similar to FIG. 4, the process of FIG. 7 involves a HO of the UE 100 from the first cell 20, served by the first base station 120, to the second cell 21, served by the second base station 121. Accordingly, the UE 100 is assumed to be initially connected to the first cell 20. Similar to the process of FIG. 4 the calculation of the eRSRP is performed in the cellular network, in particular by the first base station 120 which serves the UE 100 before the HO. However, in this case the calculation of the eRSRP is based on an estimate of the external interference IF and thermal noise NT obtained from a database 140.

The database 140 may be part of the cellular network or may be hosted externally, e.g., on an Internet server. As indicated by step 701, the database stores an estimate for the external interference IF and thermal noise NT. It is also possible to neglect the thermal noise NT and use the database to just provide an estimate of the external interference IF. The database 140 may be based on location specific records, each indicating the value of at least the external interference IF corresponding to a certain region. Further, also other keys may be used to address the database 140, e.g., state variables of the UE or considered cell. The database 140 may store values which are empirically determined, e.g., from previous measurements of the external interference IF, and/or which are based on models for predicting the external interference IF. Alternatively, the database may use such model on-the-fly to provide an estimate for the external interference IF and thermal noise NT.

As illustrated by 702, 703 the first base station 120 and the second base station 121 transmit reference signals RS, e.g., using cell specific reference symbols. As illustrated by step 704, the reference signals RS are measured by the UE 100. Specifically, the UE 100 measures the strength of the reference signals RS, e.g., in terms of the RSRP.

The UE 100 then sends a measurement report 705 to the first base station 120. The measurement report 705 indicates the measured values of the RSRP from step 704.

The first base station 120 may then send a request 706 to the database 140. The request 706 may for example indicate the location of the UE 10, e.g., in terms of geographical coordinates or identity of the cell 20 to which the UE 100 is connected. In response to the request 706 sends a report 707 which indicates the corresponding value of the external interference IF (optionally plus the thermal noise NT). This estimate may then be used as an estimate for INext.

At step 708, the first base station 120 calculates the eRSRP for the cell 20 of the first base station 120 and the eRSRP for the cell 21 of the second base station 121 from the values of the RSRP as obtained from the measurement report 705 and from INext as obtained from the report 707, using relation (1).

At step 709, the first base station 120 performs cell selection depending on the values of the eRSRP obtained at step 708. In particular, the first base station 120 selects the cell 20, 21 with the highest eRSRP, which in the illustrated example is assumed to be the second cell 21.

Having selected the second cell 21, the first base station 120 initiates execution of a HO of the UE 100 from the first cell 20 to the second cell 21, as indicated by 710. After completion of the HO, the UE 100 is associated to the second cell 21.

Figure 8:
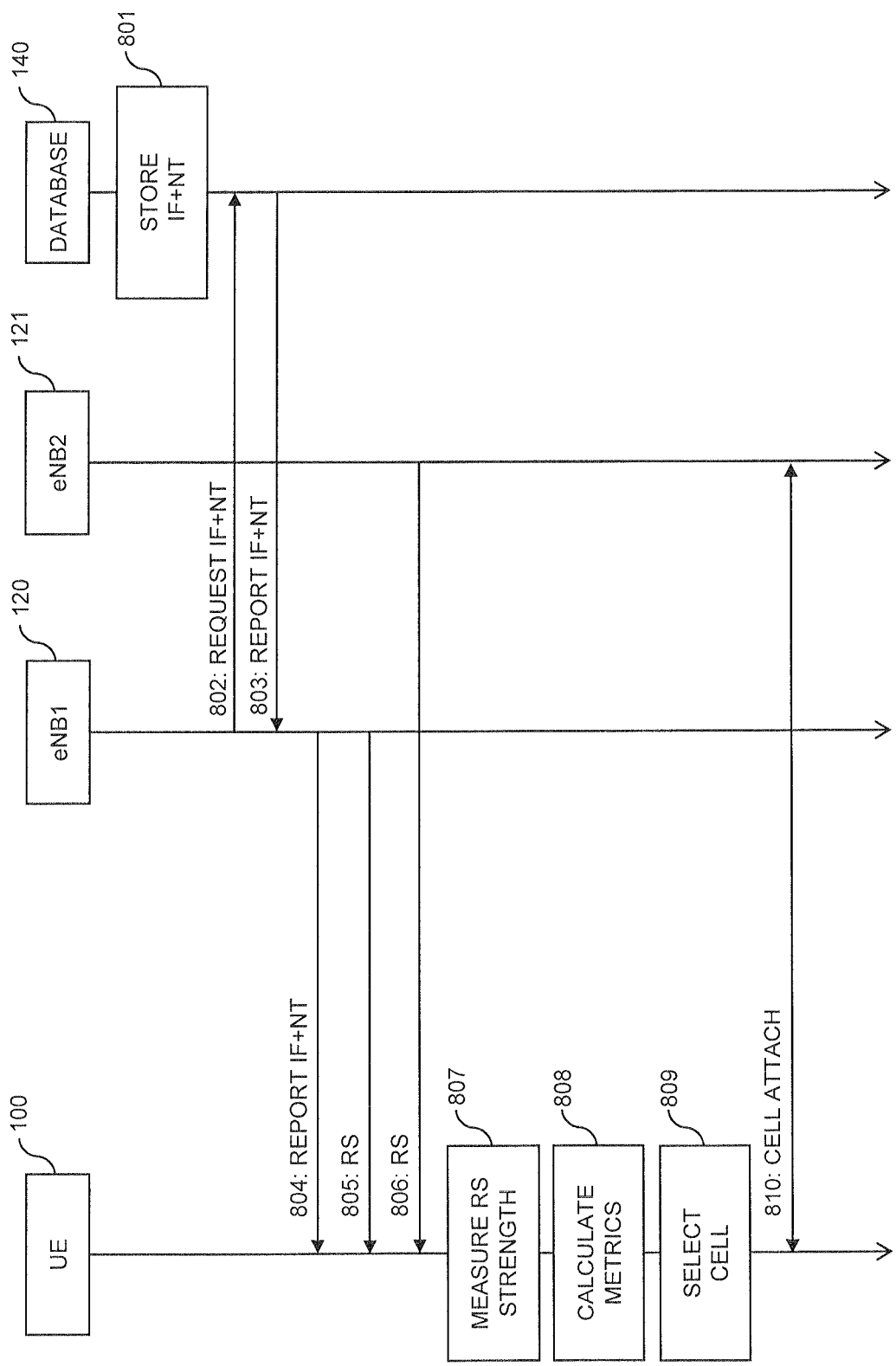
FIG. 8 illustrates an exemplary cell association process according to an embodiment of the invention, in which the metric is calculated by the UE, using information from a database, and cell selection is performed by the UE of the cellular network.

In the process of FIG. 8, cell association is performed by the UE 100. Similar to FIGS. 2 and 6, a corresponding process may for example be performed when the UE 100 is in idle mode and selects a new cell, after being attached to the first cell 20. The calculation of the eRSRP is in this case performed by the UE 100, using an estimate of the external interference IF and thermal noise NT obtained from a database 140.

As in the process of FIG. 7, the database 140 may be part of the cellular network or may be hosted externally, e.g., on an Internet server. As indicated by step 801, the database stores an estimate for the external interference IF and thermal noise NT. It is also possible to neglect the thermal noise NT and use the database to just provide an estimate of the external interference IF. The database 140 may be based on location specific records, each indicating the value of at least the external interference IF corresponding to a certain region. Further, also other keys may be used to address the database 140, e.g., state variables of the UE or considered cell. The database 140 may store values which are empirically determined, e.g., from previous measurements of the external interference IF, and/or which are based on models for predicting the external interference IF. Alternatively, the database may use such model on-the-fly to provide an estimate for the external interference IF and thermal noise NT.

As illustrated, the first base station 120 may send a request 802 to the database 140. This may be accomplished on the basis of a regular schedule or may be triggered by an event relating to the UE 100. The request 802 may for example indicate the location of the UE 10, e.g., in terms of geographical coordinates or identity of the cell 20 to which the UE 100 is connected. In response to the request 802 sends a report 803 which indicates the corresponding value of the external interference IF (optionally plus the thermal noise NT). This estimate may then be used as an estimate for INext.

The first base station 120 then sends a report 804 to the UE 100. The report 804 indicates the applicable estimate for INext.

As illustrated by 805, 806 the first base station 120 and the second base station 121 transmit reference signals RS, e.g., using cell specific reference symbols. As illustrated by step 807, the reference signals RS are measured by the UE 100. Specifically, the UE 100 measures the strength of the reference signals RS, e.g., in terms of the RSRP.

At step 808, the UE 100 calculates the eRSRP for the cell 20 of the first base station 120 and the eRSRP for the cell 21 of the second base station 121 from the values of the RSRP from step 807 and from INext as obtained from the report 804, using relation (1).

At step 809, the first base station 120 performs cell selection depending on the values of the eRSRP obtained at step 708. In particular, the first base station 120 selects the cell 20, 21 with the highest eRSRP, which in the illustrated example is assumed to be the second cell 21.

Having selected the second cell 21, the first base station 120 attaches to the second cell 21, as indicated by 810. As a result, the UE 100 is then associated to the second cell 21.

Figure 9:
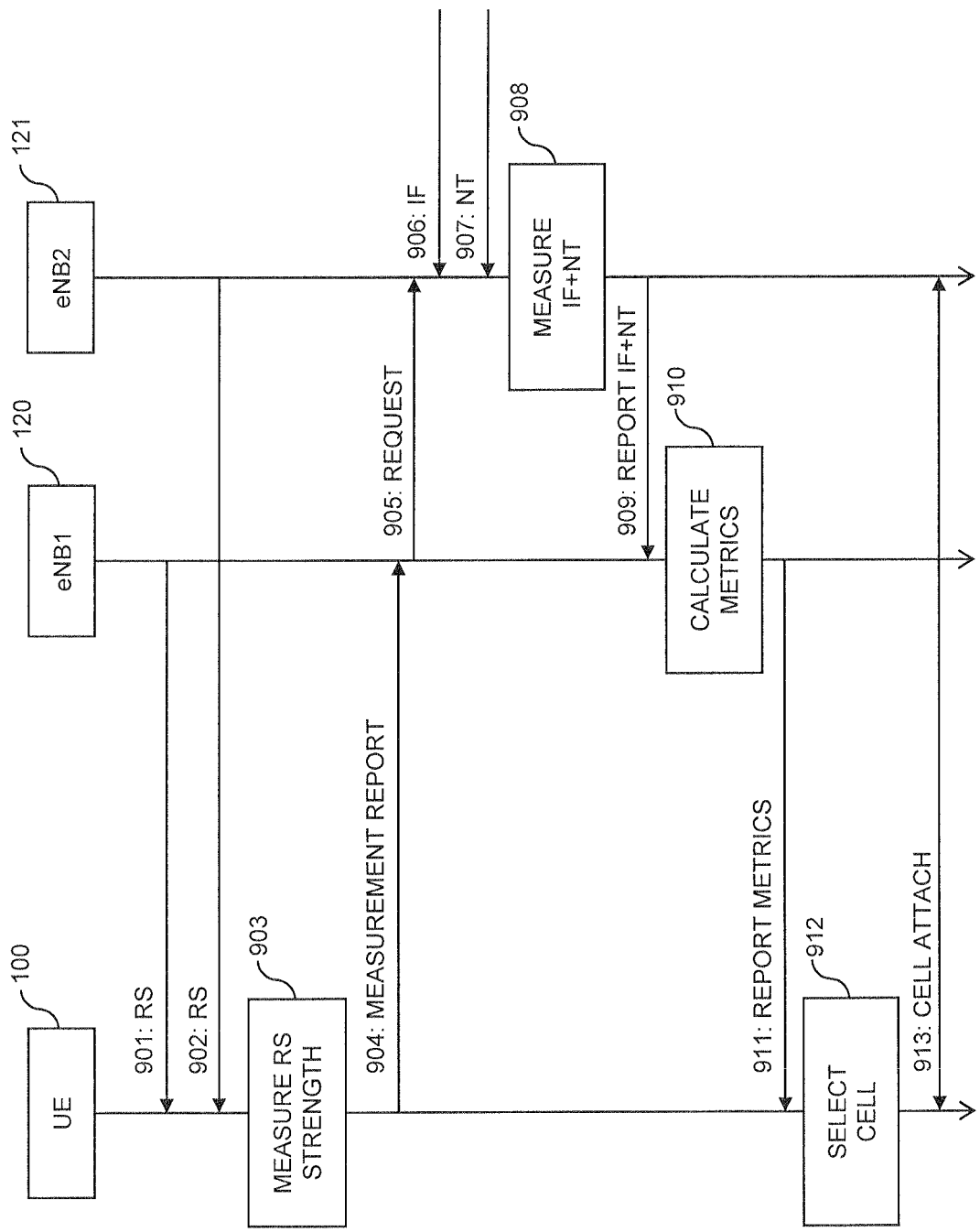
FIG. 9 illustrates an exemplary cell association process according to an embodiment of the invention, in which the metric is calculated by a node of the cellular network, using measurements performed by the UE and measurements performed by another node of the cellular network, and cell selection is performed by the UE.

In the process of FIG. 9, cell association is performed by the UE 100. Similar to FIG. 6, a corresponding process may for example be performed when the UE 100 is in idle mode and selects a new cell, while being attached to the first cell 20. The calculation of the eRSRP is performed in the cellular network, in particular by the first base station 120. Also in this case the calculation of the eRSRP is based on a measurement of the external interference IF and thermal noise NT performed in the cellular network. However, in this case the measurement of the external interference IF and the thermal noise NT is not performed by the node which calculates the eRSRP, but by another node of the cellular network. In the illustrated scenario, this other node is the second base station 121, which is the base station of the cell which is considered as a candidate for cell association.

As illustrated by 901, 902 the first base station 120 and the second base station 121 transmit reference signals RS, e.g., using cell specific reference symbols. As illustrated by step 903, the reference signals RS are measured by the UE 100. Specifically, the UE 100 measures the strength of the reference signals RS, e.g., in terms of the RSRP.

The UE 100 then sends a measurement report 904 to the first base station 120. The measurement report 604 indicates the measured values of the RSRP from step 903. On the basis of the RSRP values in the measurement report 904, the first base station 120 may identify the second cell 21 as a candidate for cell association, e.g., because the RSRP of the second cell 21 is higher than that of the first cell 20. However, the first base station 120 may also be aware that the second cell 21 experiences higher external interference IF than the first cell 20, so that a cell selection merely on the basis of the RSRP is not desirable. For example, the second cell 21 could be a pico cell with opportunistic spectrum usage.

Accordingly, the first base station 120 may send a request 905 for measurement of the external interference IF and thermal noise NT to the second base station 121. The external interference IF and the thermal noise NT as received by the second base station 121 are illustrated by 906 and 907, respectively.

At step 908, the second base station 121 measures the strength of the external interference IF and the thermal noise NT, i.e., the value Next. The configuration of the measurement in step 908 may be based on information stored in the second base station 120, e.g., by default or manually set. Further, the configuration of the measurement in step 908 may be based on information provided by another node of the cellular network, e.g., another base station or a control node. For example, the first base station 120 could provide the information in the request 905. Such information may also define one or more time intervals for performing the measurement. To facilitate distinction of the external interference IF and thermal noise NT from the radio signals transmitted in the thermal network, such time intervals may be determined to correspond to time intervals with restricted radio activity of the cellular network, e.g., ABSs. The first base station 120 could also coordinate such time intervals, e.g., by restricting its own radio activity in the time intervals and/or instructing one or more other base stations to restrict their radio activity in the time intervals. For example, the first base station 120 could be a macro base station and control subordinate pico base stations accordingly.

The second base station 121 then sends a report 909 to the first base station 120. The report 909 indicates INext as measured at step 908.

At step 910, the first base station 120 calculates the eRSRP for the cell 20 of the first base station 120 and the eRSRP for the cell 21 of the second base station 121 from the values of the RSRP as obtained from the measurement report 904 and from INext as obtained from the report 909, using relation (1).

The first base station then sends a report 911 to the UE 100. The report 911 indicates the values of the eRSRP from step 910. The report 911 may for example be sent in an idle mode signaling message, e.g., in a paging message.

At step 912, the UE 100 performs cell selection depending on the values of the eRSRP obtained at from the report 911. In particular, the first base station 120 selects the cell 20, 21 with the highest eRSRP, which in the illustrated example is assumed to be the second cell 21.

Having selected the second cell 21, the first base station 120 attaches to the second cell 21, as indicated by 913. As a result, the UE 100 is then associated to the second cell 21.

Figure 10:
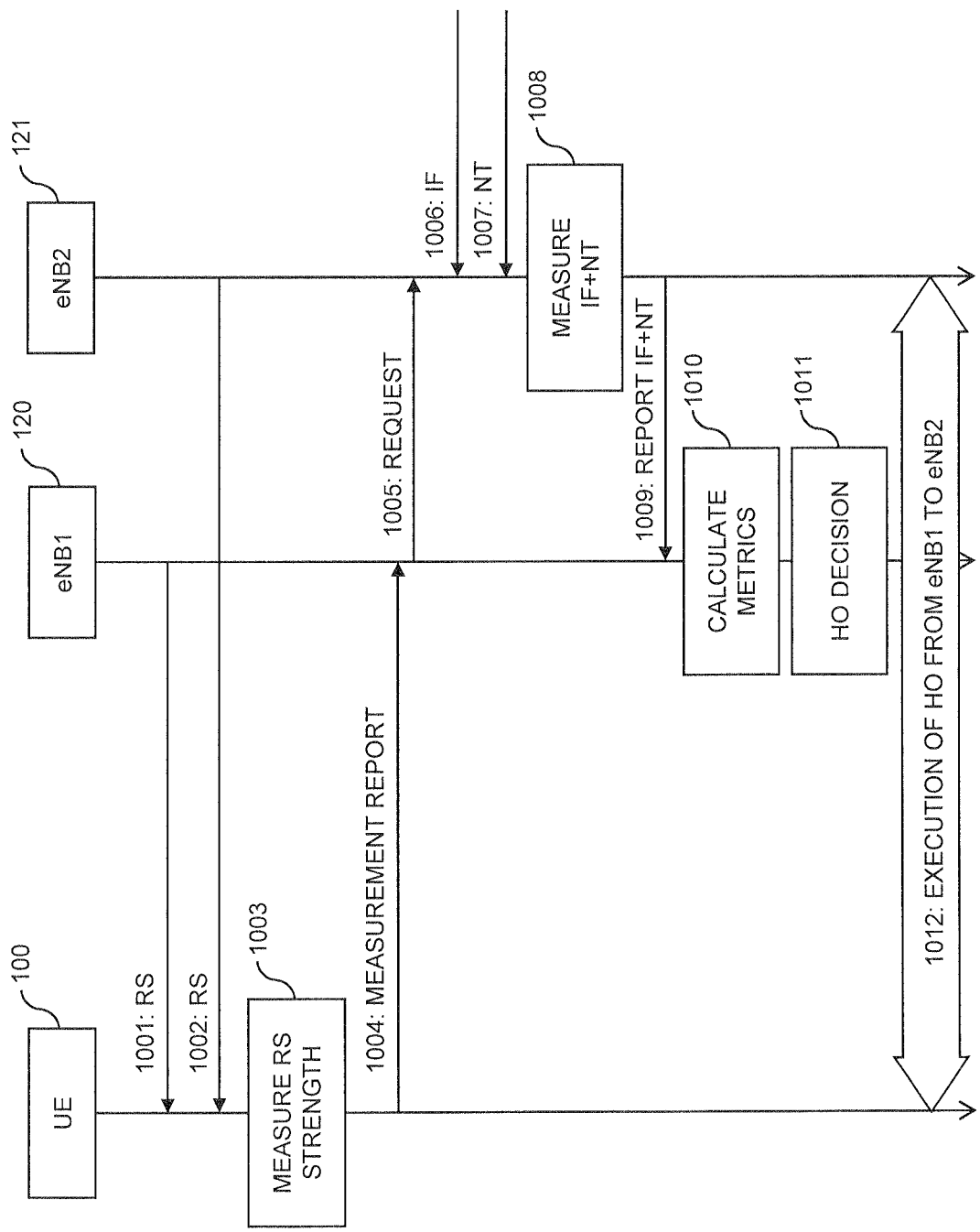
FIG. 10 illustrates an exemplary cell association process according to an embodiment of the invention, in which the metric is calculated by a node of the cellular network, using measurements performed by the UE and measurements performed by another node of the cellular network, and cell selection is performed by the node.

In the process of FIG. 10, cell association is network based cell association is network based and performed by the first base station 120. Similar to FIG. 7, the process of FIG. 10 involves a HO of the UE 100 from the first cell 20, served by the first base station 120, to the second cell 21, served by the second base station 121. Accordingly, the UE 100 is assumed to be initially connected to the first cell 20. Similar to the process of FIG. 7 the calculation of the eRSRP is performed in the cellular network, in particular by the first base station 120 which serves the UE 100 before the HO. However, in this case the calculation of the eRSRP is based on a measurement of the external interference IF and thermal noise NT performed by another node of the cellular network. In the illustrated scenario, this other node is the second base station 121, which is the base station of the cell which is considered as a candidate target cell for the HO.

As illustrated by 1001, 1002 the first base station 120 and the second base station 121 transmit reference signals RS, e.g., using cell specific reference symbols. As illustrated by step 1003, the reference signals RS are measured by the UE 100. Specifically, the UE 100 measures the strength of the reference signals RS, e.g., in terms of the RSRP.

The UE 100 then sends a measurement report 1004 to the first base station 120. The measurement report 1004 indicates the measured values of the RSRP from step 1003. On the basis of the RSRP values in the measurement report 1004, the first base station 120 may identify the second cell 21 as a candidate target cell for HO, e.g., because the RSRP of the second cell 21 is higher than that of the first cell 20. However, the first base station 120 may also be aware that the second cell 21 experiences higher external interference IF than the first cell 20, so that a cell selection merely on the basis of the RSRP is not desirable. For example, the second cell 21 could be a pico cell with opportunistic spectrum usage.

Accordingly, the first base station 120 may send a request 1005 for measurement of the external interference IF and thermal noise NT to the second base station 121. The external interference IF and the thermal noise NT as received by the second base station 121 are illustrated by 1006 and 1007, respectively.

At step 1008, the second base station 121 measures the strength of the external interference IF and the thermal noise NT, i.e., the value Next. The configuration of the measurement in step 1008 may be based on information stored in the second base station 120, e.g., by default or manually set. Further, the configuration of the measurement in step 1008 may be based on information provided by another node of the cellular network, e.g., another base station or a control node. For example, the first base station 120 could provide the information in the request 1005. Such information may also define one or more time intervals for performing the measurement. To facilitate distinction of the external interference IF and thermal noise NT from the radio signals transmitted in the thermal network, such time intervals may be determined to correspond to time intervals with restricted radio activity of the cellular network, e.g., ABSs. The first base station 120 could also coordinate such time intervals, e.g., by restricting its own radio activity in the time intervals and/or instructing one or more other base stations to restrict their radio activity in the time intervals. For example, the first base station 120 could be a macro base station and control subordinate pico base stations accordingly.

The second base station 121 then sends a report 1009 to the first base station 120. The report 1009 indicates INext as measured at step 1008.

At step 1010, the first base station 120 calculates the eRSRP for the cell 20 of the first base station 120 and the eRSRP for the cell 21 of the second base station 121 from the values of the RSRP as obtained from the measurement report 1004 and from INext as obtained from the report 1009, using relation (1).

At step 1011, the first base station 120 performs cell selection depending on the values of the eRSRP obtained at step 1010. In particular, the first base station 120 selects the cell 20, 21 with the highest eRSRP, which in the illustrated example is assumed to be the second cell 21.

Having selected the second cell 21, the first base station 120 initiates execution of a HO of the UE 100 from the first cell 20 to the second cell 21, as indicated by 1012. After completion of the HO, the UE 100 is associated to the second cell 21.

In the above processes, the eRSRP is used in different kinds of cell association processes, in particular for selecting the cell 20, 21 to which the UE 100 is associated. However, corresponding processes could also be used for connecting the UE to multiple cells. In this case, the multiple cells to which the UE is connected could be selected depending on the eRSRP. Further, corresponding processes could be used for controlling utilization of carriers. In this case, the eRSRP could be used as the basis for selecting one or more carriers to be utilized by the UE and the selected cell(s) and controlling addition or removal of carriers from the radio access configuration of the UE accordingly. Further, the eRSRP could be used for selecting the MCS for MBMS transmissions in the selected cell(s) and/or for setting the MBSFN area to which the selected cell(s) belong. Further, the eRSRP may be reported to one or more further nodes of the cellular network, e.g., to be used for network optimization processes. In the latter case, the eRSRP may allow for assessing the impact of external interference on network performance without excessively relying on drive tests or the like.

Figure 11:
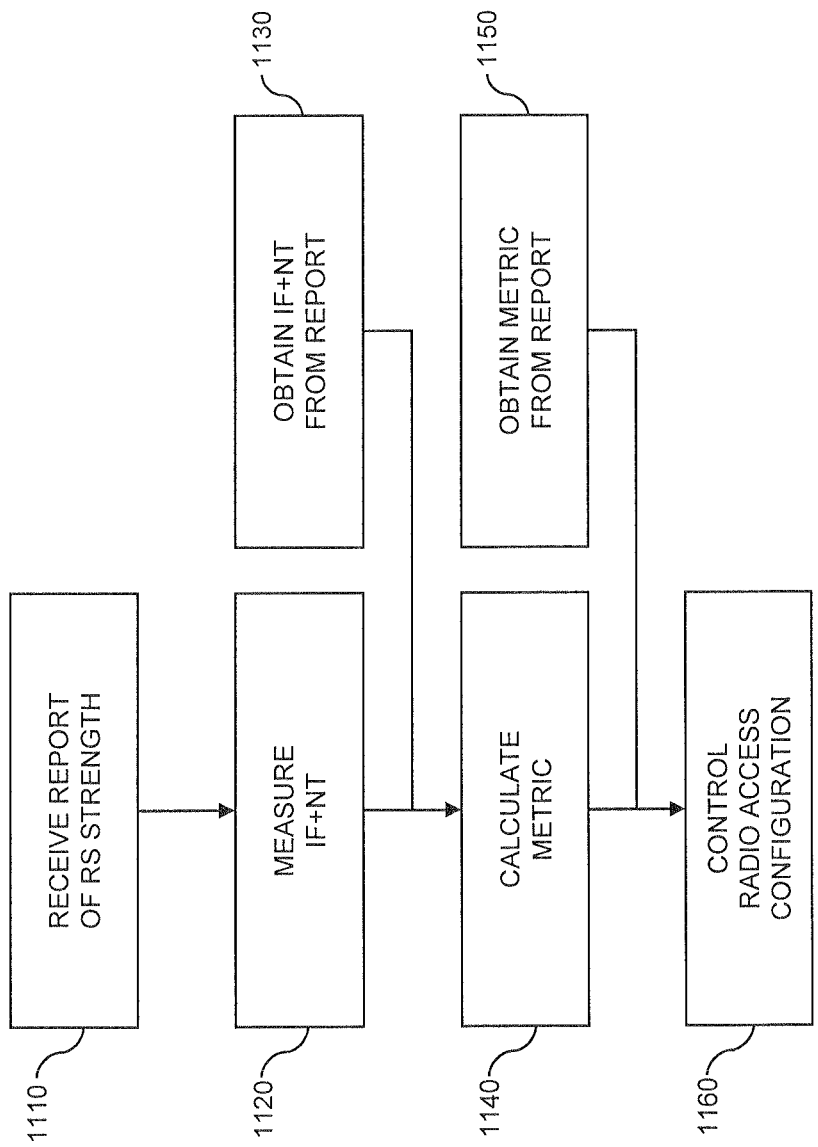
FIG. 11 shows a flowchart for illustrating a method according to an embodiment of the invention which may be used for implementing control of a radio access configuration by a node of a cellular network.

FIG. 11 shows a flowchart for illustrating a method of controlling cellular network operation. The method may for example be used for associating a UE, e.g., the UE 100, to at least one cell of a cellular network, e.g., to one of the cells 20, 21. The method may also be used for other processes of controlling the radio access configuration for the UE and the cell, e.g., controlling the utilization of carriers by the UE and the cell, controlling scheduling of radio transmissions between the UE and the cell, setting a modulation and/or coding scheme for joint radio transmissions performed jointly by a base station of the cell and one or more base stations of further cells, or for selecting such further cells.

As mentioned above, the control of the radio access configuration is performed using an interference-based metric which is defined as a ratio of a first value and a second value. The first value represents the strength of a RS transmitted by a base station of the cell as measured by the UE. The second value represents the strength of interference at the UE. The first value may be a RSRP. The second value may correspond to the strength of external interference from sources outside the cellular network. Further, the second value may include the strength of thermal noise. The second value may correspond to the above-mentioned INext.

The method of FIG. 11 may be used for implementing the above concepts in a node of the cellular network, e.g., one of the base stations 120, 121 or some other node which is responsible for performing cell association. If a processor based implementation of the node is used, the steps of the method may be performed by one or more processors of the node. For this purpose, the processor(s) may execute correspondingly configured program code. Further, at least some of the corresponding functionalities may be hardwired in the processor(s).

At step 1110, the node may receive a report from the UE. The report indicates the first value. Examples of such reports are the above-mentioned measurement reports 308, 407, 504, 705, and 1004 in the processes of FIGS. 3-5, 7, and 10.

At step 1120, the node may measure the second value. An examples of such measurement is described in connection with step 507 in the process of FIG. 5. The node may perform the measurement in a time interval with restricted radio activity of the cellular network, e.g., in an ABS. Such time intervals may be coordinated in the cellular network.

As an alternative to the measurement of step 1120, the node may also receive a report and obtain the second value from the report, as indicated by step 1130. Examples of such reports are the above-mentioned reports 407, 707, and 1009 in the processes of FIGS. 4, 7, and 10. The report of step 1130 could be received from the UE or from another node of the cellular network, e.g., from a base station of the cell, from the base station of another cell, or from a control node.

In some implementations, the report of step 1130 could be received from a database, such as the database 140. The database may store the second value in a record which corresponds to the location of the UE and/or to the location of the considered cell. The node may obtain the second value directly from the database or via a further node of the cellular network, e.g., via an Operations Support System (OSS). In addition or as an alternative to using the location of the UE as a key for accessing the database, other state variables may be used as well. For example, such state variables could relate to antenna information, e.g., antenna height above ground level, kind of used antenna(s) (e.g., as indicated by the UE type). The latter state variables may allow for a refined assessment of the sensitivity of the UE to the interference as represented by the second value. The database may be based on an airshed model. In this case, the second value as returned by the database may be completely pre-calculated using the airshed model. Alternatively, the key(s) used to address the database may be used to identify a specific configuration of the airshed model which is based on pre-calculated values, and the second value may be calculated on-the-fly using additional information from the key(s). Still further, the database may use the airshed model on-the-fly for providing the second value using information from the key(s).

The report of step 1130 may be obtained at a rate which is lower than a rate of obtaining the report of step 1110. In this way, excessive signaling for reporting the second value may be avoided by taking into account that the interference represented by the second value is typically less variable than the strength of the reference signal represented by the first value.

At step 1140, the node may calculate the metric. For example, the node may calculate the metric as the eRSRP, using relation (1).

As an alternative to obtaining the metric by calculation in step 1140, the node may obtain the metric from a report, as indicated by step 1150. The report of step 1150 could be received from the UE or from another node of the cellular network, e.g., from a base station of the cell, from the base station of another cell, or from a control node. A example of such report is the above-described measurement report 308 in the process of FIG. 3.

At step 1160, the node controls the radio access configuration for the UE and the cell. This is accomplished on the basis of the metric obtained at step 1140 or 1150.

In some implementations, the control of step 1160 may involve performing association of the UE to the cell. This may also involve selecting the cell from a plurality of cells. For example, the cell could be selected in response to having a higher value of the metric than such other cells. In some scenarios, the cell could also be selected in response to the metric being higher than a threshold value, without comparison to other cells. In the method of FIG. 11, the process of cell association may correspond to a HO to the cell. In some implementations, the UE may also be associated to multiple cells, e.g., to both of the above-mentioned cells 20 and 21.

In some implementations, the control of step 1160 may also involve controlling scheduling of radio transmissions between the UE and the cell. For example, if multiple carriers are utilized by the UE and the cell, one or more of these carriers could be selected depending on the metric and then be used for scheduling and performing data transmissions. Further, if the UE is associated to multiple cells, one or more of these cells could be selected depending on the metric and then be used for scheduling and performing data transmissions. This may also involve selecting a bases station for performing the scheduling. Still further, the metric may be used in the scheduling process itself, e.g., for assigning certain radio resources to the UE.

In some implementations, the control of step 1160 may also involve setting a modulation and/or coding scheme for joint radio transmissions performed jointly by the base station of the cell and one or more base stations of further cells of the cellular network.

In some implementations, the node may also report the obtained metric to a further node of the cellular network, e.g., to be used for network optimization processes.

In some implementations, the node may also select between controlling the radio access configuration depending on the metric and controlling the radio access configuration depending on another metric. For example, such other metric could be the RSRP or RSRQ. For example, the selection could depend on the second value or an estimate for the second value. In this case, association depending on the interference-based metric could be used in response to the strength of interference being above a threshold. The selection could also depend on a load of the cell and/or on a load of other cells of the cellular network. In this case, association depending on the interference-based metric could be used in response to the load being above a threshold. The selection could also depend on one or more previous cell selection processes, e.g., on a rate of failed HOs, a rate of ping-pong HOs, or a rate of failed idle mode cell selection processes. In this case, cell association depending on the interference-based metric could be used in response to the rate of failed cell association processes being above a threshold. Accordingly, the cell association process association depending on the interference-based metric may be selected on an as needed basis, thereby limiting the resources required for implementing additional measurements, signaling, or processing in connection with determining the interference-based metric.

Figure 12:
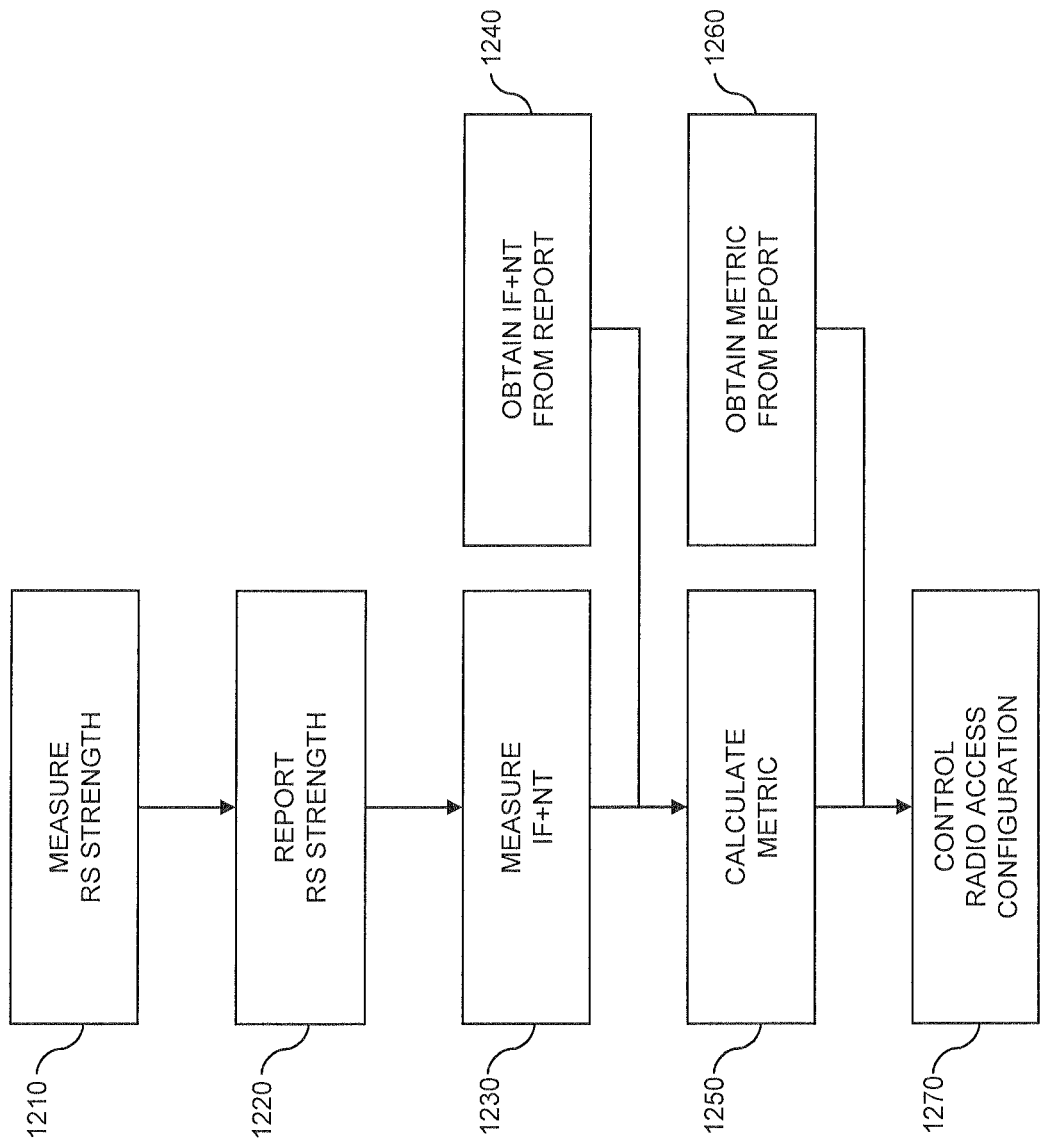
FIG. 12 shows a flowchart for illustrating a method according to an embodiment of the invention which may be used for implementing control of a radio access configuration by a UE.

FIG. 12 shows a flowchart for illustrating a further method of controlling cellular network operation. For example, the method of may be used for associating a UE, e.g., the UE 100, to at last one cell of a cellular network, e.g., to one of the cells 20, 21. However, the method may also be used for other processes of controlling the radio access configuration for the UE and the cell.

As mentioned above, the control of the radio access configuration is performed using an interference-based metric which is defined as a ratio of a first value and a second value. The first value represents the strength of a RS transmitted by a base station of the cell as measured by the UE. The second value represents the strength of interference at the UE.

The first value may be a RSRP. The second value may correspond to the strength of external interference from sources outside the cellular network. Further, the second value may include the strength of thermal noise. The second value may correspond to the above-mentioned INext.

The method of FIG. 12 may be used for implementing the above concepts in a UE, e.g., the UE 100. If a processor based implementation of the UE is used, the steps of the method may be performed by one or more processors of the UE. For this purpose, the processor(s) may execute correspondingly configured program code. Further, at least some of the corresponding functionalities may be hardwired in the processor(s).

At step 1210, the UE may measure the first value. Examples of such measurements are described in connection with steps 203, 603, 807, and 903 in the processes of FIGS. 2, 6, 8, and 9. The UE may also report the measured value, as indicated by step 1220. Examples of such reports are the measurement reports 604 and 904 in the processes of FIGS. 6 and 9.

At step 1230, the UE may measure the second value. An examples of such measurement is described in connection with steps 206 in the process of FIG. 2. The UE may perform the measurement in a time interval with restricted radio activity of the cellular network, e.g., in an ABS. Such time intervals may be coordinated in the cellular network, e.g., by a base station. In some implementations, the UE may also report the measurement of the second value to the cellular network. The measuring and/or reporting of the second value may be performed at a rate which is lower than a rate used for measuring and/or reporting of the first value at step 1210, thereby taking into account that the interference represented by the second value is typically less variable than the strength of the reference signal represented by the first value.

As an alternative to the measurement of step 1230, the UE may also receive a report and obtain the second value from the report, as indicated by step 1240. An example of such report is the above-mentioned report 804 in the process of FIG. 8. As in the exemplary process of FIG. 8, the report of step 1240 could be received from a database, such as the database 140. The database may store the second value in a record which corresponds to the location of the UE. However, the report of step 1240 could also be received from a node of the cellular network which performed a measurement of the second value, e.g., from a base station of the cell or, from the base station of another cell.

At step 1250, the UE may calculate the metric. For example, the UE may calculate the metric as the eRSRP, using relation (1).

As an alternative to obtaining the metric by calculation in step 1250, the UE may obtain the metric from a report, as indicated by step 1260. The report of step 1260 could be received from a node of the cellular network, e.g., from a base station of the cell or from the base station of another cell. Examples of such reports are the above-mentioned reports 609 and 911 in the processes of FIGS. 6 and 9.

At step 1270, the UE controls the radio access configuration for the UE and the cell. This is accomplished on the basis of the metric obtained at step 1250 or 1260.

In some implementations, the control of step 1270 may involve performing association of the UE to the cell. This may also involve selecting the cell from a plurality of cells. For example, the cell could be selected in response to having a higher value of the metric than such other cells. In some scenarios, the cell could also be selected in response to the metric being higher than a threshold value, without comparison to other cells. In the method of FIG. 12, the process of cell association may for example correspond to a cell selection or cell-reselection in idle mode. In some implementations, the UE may also be associated to multiple cells, e.g., to both of the above-mentioned cells 20 and 21.

In some implementations, the node may also report the obtained metric to a further node of the cellular network, e.g., to be used for network optimization processes.

In some implementations, the UE may also select between performing the control of the radio access configuration depending on the metric and performing control of the radio access configuration depending on another metric. For example, such other metric could be the RSRP or RSRQ. For example, the selection could depend on the second value or an estimate for the second value. In this case, association depending on the interference-based metric could be used in response to the strength of interference being above a threshold.

The selection could also depend on a load of the cell and/or on a load of other cells of the cellular network. In this case, association depending on the interference-based metric could be used in response to the load being above a threshold. The selection could also depend on one or more previous cell selection processes, e.g., on a rate of failed HOs, a rate of ping-pong HOs, or a rate of failed idle mode cell selection processes. In this case, the association depending on the interference-based metric could be used in response to the rate of failed cell association processes being above a threshold. Accordingly, the cell association process association depending on the interference-based metric may be selected on an as needed basis, thereby limiting the resources required for implementing additional measurements, signaling, or processing in connection with determining the interference-based metric.

Figure 13:
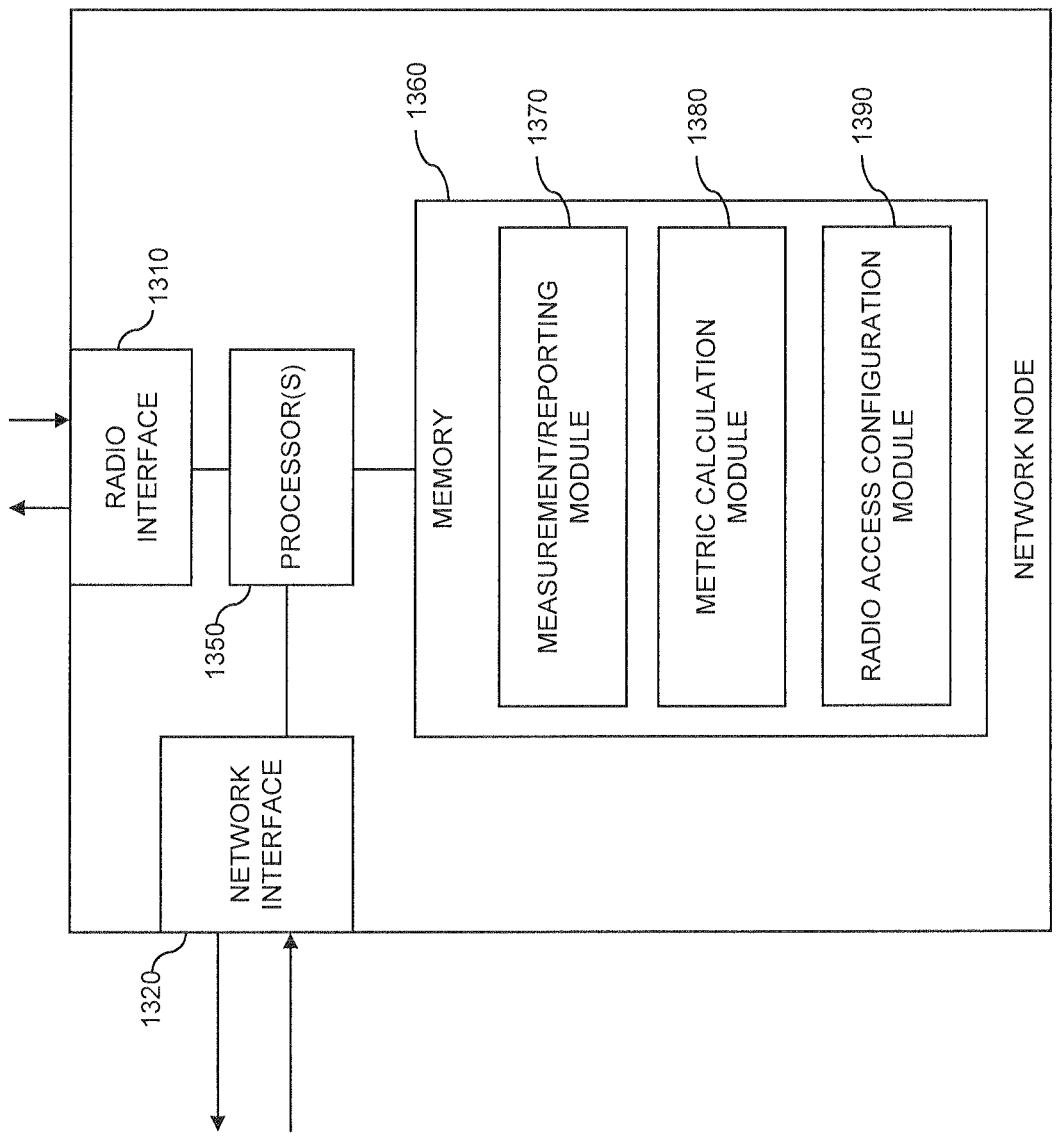
FIG. 13 schematically illustrates device structures for implementing a node of a cellular network according to an embodiment of the invention.

FIG. 13 schematically illustrates a device for a processor based implementation of a node for a cellular network which may perform the above-mentioned cell association using the interference-based metric. The device of FIG. 13 may for example correspond to one of the base stations 120, 121.

In the illustrated example, it is assumed that the device has base station functionalities. Accordingly, the device includes a radio interface 1310 for communication with a UE, e.g., with the UE 100. As further illustrated, the device may include a network interface 1320 for communication with other nodes of the cellular network, e.g., other base stations, and/or for communication with nodes outside the cellular network, e.g., the database 140. In the illustrated concepts, the radio interface 1310 and/or the network interface 1320 may be used for controlling the radio access configuration for the UE and one or more cells, e.g., by sending and/or receiving control messages. However, it is to be understood that depending on the functionality of the node in the cellular network also other types of interfaces could be used for controlling the cell association.

Further, the device includes one or more processor(s) 1350 coupled to the interfaces 1310, 1320 and a memory 1360 coupled to the processor 1350. The memory 1360 may include a read-only memory (ROM), e.g., a flash ROM, a random-access memory (RAM), e.g., a dynamic RAM (DRAM) or static RAM (SRAM), a mass storage, e.g., a hard disk or solid state disk, or the like. The memory 1360 includes suitably configured program code modules to be executed by the processor(s) 1350 so as to implement the above-described functionalities of the node of the cellular network. More specifically, the program code modules in the memory 1360 may include a measurement/reporting module 1370 so as to implement the above-described functionalities of performing measurements, reporting the measurements, or obtaining information from a received report, in particular concerning the second value. Further, the program code modules in the memory 1360 may also include a metric calculation module 1380 so as to implement the above-described functionalities of calculating the interference-based metric, e.g., using relation (1). Still further, the program code modules in the memory 1360 may also include a radio access configuration module 1390 so as to implement the above-described functionalities of controlling the radio access configuration depending on the interference-based metric.

It is to be understood that the structure as illustrated in FIG. 13 is merely schematic and that the device may actually include further components which, for the sake of clarity, have not been illustrated, e.g., further interfaces such as a management or control interface. Also, it is to be understood that the memory 1360 may include further types of program code modules, which have not been illustrated, e.g., program code modules for implementing known functionalities of a base station or other node of a cellular network. In some implementations, also a computer program may be provided for implementing functionalities of the node, e.g., in the form of tangible product such as a non-transitory medium storing one or more of the program code modules to be stored in the memory 1360 or by making one or more of the program code modules available for download.

Figure 14:
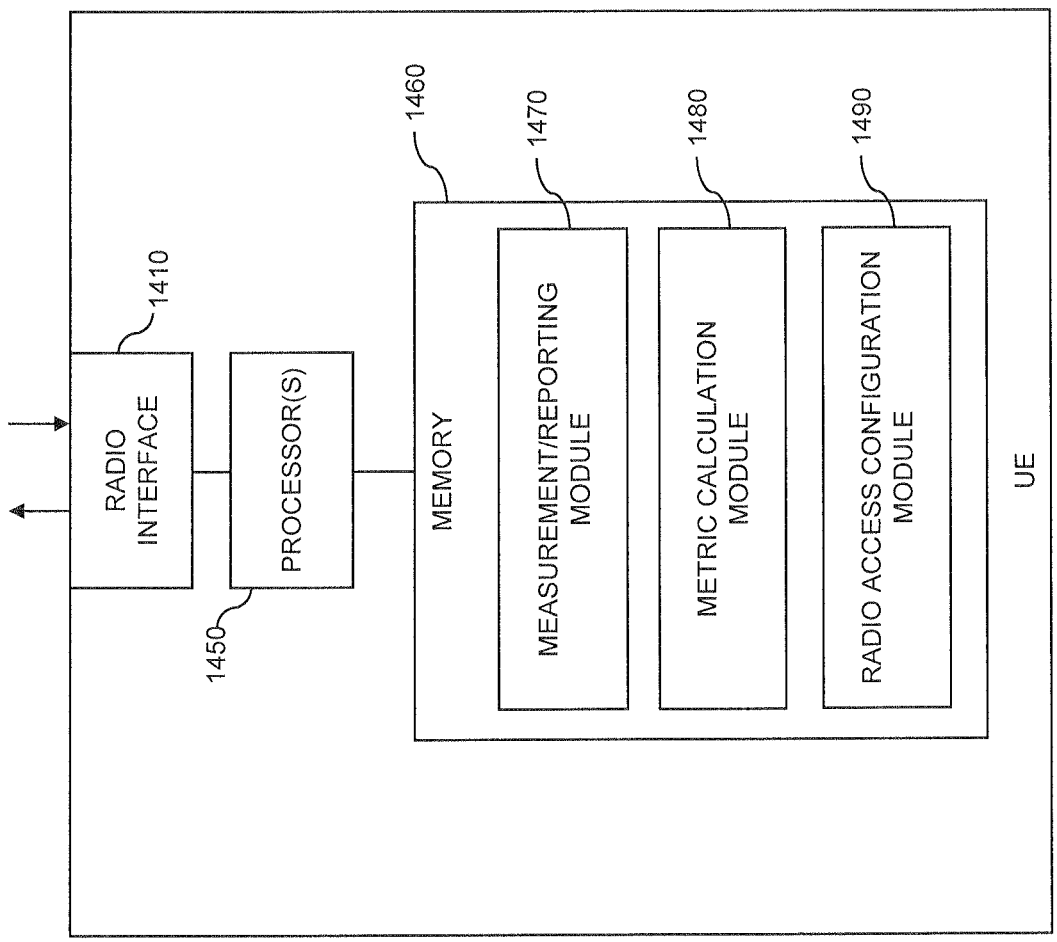
FIG. 14 schematically illustrates device structures for implementing a UE according to an embodiment of the invention.

FIG. 14 schematically illustrates a device for a processor based implementation of a UE for a cellular network which may perform the above-mentioned cell association using the interference-based metric. The device of FIG. 14 may for example correspond to the UE 100.

In the illustrated example, the device includes a radio interface 1410 for communication with a the cellular network.

Further, the device includes one or more processor(s) 1450 coupled to the interfaces 1410, 1420 and a memory 1460 coupled to the processor 1450. The memory 1460 may include a ROM, e.g., a flash ROM, a RAM, e.g., a DRAM or SRAM, a mass storage, e.g., a hard disk or solid state disk, or the like. The memory 1460 includes suitably configured program code modules to be executed by the processor(s) 1450 so as to implement the above-described functionalities of the node of the cellular network. More specifically, the program code modules in the memory 1460 may include a measurement/reporting module 1470 so as to implement the above-described functionalities of performing measurements, reporting the measurements, or obtaining information from a received report, in particular concerning the second value. Further, the program code modules in the memory 1460 may also include a metric calculation module 1480 so as to implement the above-described functionalities of calculating the interference-based metric, e.g., using relation (1). Still further, the program code modules in the memory 1460 may also include a radio access configuration module 1490 so as to implement the above-described functionalities of controlling the radio access configuration depending on the interference-based metric.

It is to be understood that the structure as illustrated in FIG. 14 is merely schematic and that the device may actually include further components which, for the sake of clarity, have not been illustrated, e.g., further interfaces. Also, it is to be understood that the memory 1460 may include further types of program code modules, which have not been illustrated, e.g., program code modules for implementing known functionalities of a UE. In some implementations, also a computer program may be provided for implementing functionalities of the UE, e.g., in the form of tangible product such as a non-transitory medium storing one or more of the program code modules to be stored in the memory 1460 or by making one or more of the program code modules available for download.

As can be seen, in the concepts as described above the interference-based metric may be used for efficiently controlling the radio access configuration for a UE and one ore more cells. For example, cell association may be performed in an efficient manner. Specifically, unfavorable cell selections may be avoided by using the interference-based metric. This in turn allows for providing an improved performance or capacity of the cellular network.

It is to be understood that the examples and embodiments as explained above are merely illustrative and susceptible to various modifications. For example, the interference-based metric could be used for other control operations. Further, the concepts could be used in connection with various types of radio technology and cellular network infrastructure. Still further, rather than utilizing the interference-based metric for performing a control operation, the above-mentioned node of the cellular network could merely obtain the interference-based metric by measurement and calculation as explained above and then report the interference-based metric to a further node of the cellular network, e.g., to be used for network optimization or in monitoring procedures. Similarly, rather than utilizing the interference-based metric for performing a control operation, the UE could merely obtain the interference-based metric by measurement and calculation as explained above and then report the interference-based metric to a node of the cellular network, e.g., to be used for network optimization or in monitoring procedures.

Moreover, it is to be understood that the above concepts may be implemented by using correspondingly designed software to be executed by one or more processors of an existing device, or by using dedicated device hardware. Also, the devices as described herein may be implemented by a single device or by a system of multiple component devices. For example, the above-mention base station of a cellular network could be implemented by a system in which the illustrated functionalities are distributed over two or more devices. For example, the logic for implementing the cell association could be implemented separately from a radio unit which performs the actual radio communication with the UE.

The invention claimed is:

1. A method for controlling cellular network operation, the method comprising:
   receiving, by a node of a cellular network, a first report from a user equipment;
   obtaining, by the node of the cellular network, a first value from the first report;
   receiving, by the node of the cellular network, a second report from the user equipment;
   obtaining, by the node of the cellular network, a second value from the received second report;
   calculating, by the node of the cellular network, a metric, wherein the metric is a ratio of the first value and the second value, the first value representing a strength of a reference signal (RS) transmitted by a base station of a cell of the cellular network, as measured by the user equipment, and the second value representing sum of a strength of interference (IF) at the user equipment and a thermal noise (NT), wherein the second report is received at a rate lower than a rate of receiving the first report, and wherein the reception of the second report is at the rate lower than the rate of reception of the first report when the strength of interference (IF) represented by the second value is less variable than the strength of the reference signal (RS) represented by the first value;
   selecting, by the node of the cellular network, between controlling radio access configuration depending on the metric and controlling the radio access configuration depending on another metric, wherein the other metric is the first value; and
   controlling, by the node of the cellular network, the radio access configuration for the user equipment and the cell based on the selection,
   wherein said controlling of the radio access configuration comprises controlling association of the user equipment to the cell, wherein the second value further represents a strength of interference from outside the cellular network, and wherein said controlling of the radio access configuration further comprises: controlling utilization of one or more carriers between the user equipment and the cell and controlling scheduling of radio transmissions between the user equipment and the cell.

2. The method according to claim 1, wherein said controlling of the radio access configuration further comprises setting a modulation and/or coding scheme for joint radio transmissions performed jointly by the base station of the cell and one or more base stations of further cells of the cellular network.

3. The method according to claim 1, further comprising: reporting, by the node of the cellular network, the metric to a further node of the cellular network.

4. The method according to claim 1, further comprising: measuring, by the node of the cellular network, the second value.

5. The method according to claim 4, further comprising: measuring, by the node of the cellular network, the second value in a time interval with restricted radio activity of the cellular network.

6. The method according to claim 1, further comprising: obtaining, by the node of the cellular network, the second value from a database.

7. The method according to claim 6, further comprising: obtaining, by the node of the cellular network, the second value from a record of the database which corresponds to a location of the user equipment and/or of the cell.

8. The method according to claim 1, further comprising: obtaining, by the node of the cellular network, the second value from a further node of the cellular network.

9. The method according to claim 4, further comprising: reporting, by the node of the cellular network, the second value to the user equipment.

10. The method according to claim 1, further comprising:
coordinating, by the node of the cellular network, a measurement of the second value to be performed in a time interval with restricted radio activity of the cellular network.

11. The method according to claim 1, wherein the first value is a Reference Signal Received Power (RSRP).

12. A method for controlling cellular network operation, the method comprising:
measuring, by a user equipment, a first value;
reporting, by the user equipment, the first value to a node of a cellular network;
measuring, by the user equipment, a second value;
reporting, by the user equipment, the second value to the node of the cellular network;
calculating, by the user equipment, a metric, wherein the metric is a ratio of the first value and the second value, the first value representing strength of a reference signal (RS) transmitted by a base station of a cell of the cellular network, as measured by the user equipment, and the second value representing sum of a strength of interference (IF) at the user equipment and a thermal noise (NT), wherein the reporting of the second value is performed at a rate which is lower than a rate used for the reporting of the first value, and wherein the reporting of the second value is at the rate lower than the rate of reporting of the first value when the strength of interference (IF) represented by the second value is less variable than the strength of the reference signal (RS) represented by the first value;
selecting, by the user equipment, between controlling radio access configuration depending on the metric and controlling the radio access configuration depending on another metric, wherein the other metric is the first value; and
controlling, by the user equipment, the radio access configuration for the user equipment and the cell based on the selection,
wherein said controlling of the radio access configuration comprises controlling association of the user equipment to the cell, and wherein the second value further represents a strength of interference from outside the cellular network.

13. The method according to claim 12, further comprising:
reporting, by the user equipment, the metric to the node of the cellular network.

14. The method according to claim 12, further comprising:
measuring, by the user equipment, the second value in a time interval with restricted radio activity of the cellular network.

15. The method according to claim 12, further comprising:
receiving, by the user equipment, a report from the node of the cellular network; and
obtaining, by the user equipment, the second value from the report.

16. The method according to claim 12, wherein the first value is a Reference Signal Received Power (RSRP).

17. A computer program product comprising a non-transitory computer readable storage medium storing program code to be executed by at least one processor of the node of the cellular network, wherein execution of the program code causes the at least one processor to perform steps of the method according to claim 1.

18. A computer program product comprising a non-transitory computer readable storage medium storing program code to be executed by at least one processor of the user equipment of the cellular network, wherein execution of the program code causes the at least one processor to perform steps of the method according to claim 12.

19. The method according to claim 1, wherein said selecting by the node of the cellular network comprises selecting the controlling the radio access configuration depending on the metric, in response to the strength of interference (IF) being above a threshold.

* * * * *